(12) United States Patent
Rohr et al.

(10) Patent No.: US 10,365,363 B2
(45) Date of Patent: Jul. 30, 2019

(54) MOBILE LOCALIZATION USING SPARSE TIME-OF-FLIGHT RANGES AND DEAD RECKONING

(71) Applicant: Humatics Corporation, Cambridge, MA (US)

(72) Inventors: David Rohr, Carlsbad, CA (US); Josh Senna, Carlsbad, CA (US); Akshay Kumar Jain, Carlsbad, CA (US); J. Alan Atherton, Carlsbad, CA (US); David J. Bruemmer, Idaho Falls, ID (US)

(73) Assignee: Humatics Corporation, Waltham, MA (US)

( * ) Notice: Subject to any disclaimer, the term of this patent is extended or adjusted under 35 U.S.C. 154(b) by 272 days.

(21) Appl. No.: 15/170,665

(22) Filed: Jun. 1, 2016

(65) Prior Publication Data

US 2016/0349362 A1 Dec. 1, 2016

Related U.S. Application Data

(63) Continuation-in-part of application No. 15/149,064, filed on May 6, 2016, now abandoned.
(Continued)

(51) Int. Cl.
*G01S 19/31* (2010.01)
*G01S 13/86* (2006.01)
(Continued)

(52) U.S. Cl.
CPC .............. *G01S 13/86* (2013.01); *G01C 21/12* (2013.01); *G01C 21/28* (2013.01); *G01S 5/0263* (2013.01);
(Continued)

(58) Field of Classification Search
CPC ........ G01S 13/86; G01S 13/06; G01S 17/023; G01S 17/06; G01S 17/42; G01S 19/26;
(Continued)

(56) References Cited

U.S. PATENT DOCUMENTS

| 6,054,950 A | 4/2000 | Fontana |
| 7,388,541 B1 * | 6/2008 | Yang ..................... G01C 21/206 342/464 |

(Continued)

OTHER PUBLICATIONS

International Search Report and Written Opinion of the International Search Authority; Aug. 19, 2016; PCT/US2016/031380.
(Continued)

*Primary Examiner* — Chuong P Nguyen
(74) *Attorney, Agent, or Firm* — Wolf, Greenfield & Sacks, P.C.

(57) ABSTRACT

Mobile localization of an object having an object positional frame of reference using sparse time-of-flight data and dead reckoning can be accomplished by creating a dead reckoning local frame of reference, including an estimation of object position with respect to known locations from one or more Ultra Wide Band transceivers. As the object moves along its path, a determination is made using the dead-reckoning local frame of reference. When the object is within a predetermine range of one or more of the Ultra Wide Band transceivers, a "conversation" is initiated, and range data between the object and the UWB transceiver(s) is collected. Using multiple conversations to establish accurate range and bearing information, the system updates the object's position based on the collected data.

1 Claim, 15 Drawing Sheets

Related U.S. Application Data

(60) Provisional application No. 62/169,689, filed on Jun. 2, 2015, provisional application No. 62/333,128, filed on May 6, 2016, provisional application No. 62/332,234, filed on May 5, 2016, provisional application No. 62/158,940, filed on May 8, 2015.

(51) Int. Cl.
| | | |
|---|---|---|
| *G01C 21/12* | (2006.01) | |
| *G01S 5/02* | (2010.01) | |
| *G01C 21/28* | (2006.01) | |
| *G01S 17/06* | (2006.01) | |
| *G01S 13/06* | (2006.01) | |
| *G01S 13/02* | (2006.01) | |
| *G01S 19/26* | (2010.01) | |
| *G01S 17/02* | (2006.01) | |
| *G01S 17/42* | (2006.01) | |

(52) U.S. Cl.
CPC .............. *G01S 13/06* (2013.01); *G01S 17/06* (2013.01); *G01S 13/0209* (2013.01); *G01S 17/023* (2013.01); *G01S 17/42* (2013.01); *G01S 19/26* (2013.01)

(58) Field of Classification Search
CPC ........ G01S 19/47; G01S 19/49; G01S 5/0263; G01C 21/165; G01C 21/28; G01C 21/12; G01C 21/16
USPC ......... 342/21, 357.65, 357.71, 450; 701/472, 701/494, 500
See application file for complete search history.

(56) References Cited

U.S. PATENT DOCUMENTS

| | | | |
|---|---|---|---|
| 7,403,853 B1 | 7/2008 | Janky et al. | |
| 7,468,696 B2 | 12/2008 | Bornholdt | |
| 8,063,825 B1* | 11/2011 | Yang | G01S 5/0072 342/458 |
| 8,199,047 B2* | 6/2012 | Fretenburg | G01S 13/325 342/118 |
| 8,253,985 B2 | 8/2012 | Fu et al. | |
| 8,275,193 B2 | 9/2012 | Lin | |
| 8,314,731 B2* | 11/2012 | Fretenburg | G01S 13/325 342/118 |
| 8,868,323 B2 | 10/2014 | Lommel et al. | |
| 9,154,920 B2* | 10/2015 | O'Brien | B60R 25/24 |
| 9,612,325 B2* | 4/2017 | Taylor, Jr. | G01S 13/84 |
| 2005/0134440 A1 | 6/2005 | Breed | |
| 2006/0277086 A1 | 12/2006 | Ball et al. | |
| 2006/0277089 A1 | 12/2006 | Hubbard et al. | |
| 2008/0088508 A1 | 4/2008 | Smith | |
| 2008/0303717 A1* | 12/2008 | Durban | G01S 1/44 342/371 |
| 2010/0058201 A1 | 3/2010 | Harvey et al. | |
| 2010/0274481 A1 | 10/2010 | Krishnaswamy et al. | |
| 2014/0035725 A1 | 2/2014 | Bruemmer et al. | |
| 2014/0049429 A1 | 2/2014 | Bruemmer et al. | |
| 2014/0222248 A1 | 8/2014 | Levien et al. | |
| 2014/0305204 A1 | 10/2014 | Hong et al. | |
| 2014/0358434 A1* | 12/2014 | Zhang | G01C 21/165 701/501 |
| 2015/0358810 A1 | 12/2015 | Chao et al. | |
| 2016/0270012 A1 | 9/2016 | Chen et al. | |
| 2016/0357193 A1 | 12/2016 | Bruemmer et al. | |
| 2017/0023659 A1 | 1/2017 | Bruemmer et al. | |
| 2017/0136622 A1 | 5/2017 | Bruemmer et al. | |
| 2018/0038939 A1* | 2/2018 | Bruemmer | G01S 5/0289 |
| 2018/0045807 A1* | 2/2018 | Senna | G01S 5/0045 |
| 2018/0059231 A1 | 3/2018 | Dewberry et al. | |
| 2019/0037348 A1* | 1/2019 | Yang | H04W 4/023 |

OTHER PUBLICATIONS

International Search Report and Written Opinion for International Application No. PCT/US2016/035396 dated Mar. 23, 2017.
International Search Report and Written Opinion for International Application No. PCT/US2016/035405 dated Aug. 29, 2016.
International Search Report and Written Opinion for International Application No. PCT/US2016/035410 dated Feb. 22, 2017.
Chiu, Ultra Wideband Augmented GPS. Department of Geomatics Engineering. Geomatics Engineering. Dec. 2008. 187 pages.
Dierenbach et al., UWB for Navigation in GNSS Compromised Environments. Research Gate. Aug. 2015. 11 pages.
Pacholski, Extending the Sensor Edge Smart Drone Positioning System. University of Adelaide. Nov. 8, 2013. 58 pages.

* cited by examiner

MOBILE LOCALIZATION USING SPARSE TIME-OF-FLIGHT RANGES AND DEAD RECKONING

RELATED APPLICATIONS

The present application claims the benefit under 35 U.S.C. § 120 and is a Continuation-In-Part of U.S. Non-Provisional application Ser. No. 15/149,064 filed 6 May 2016 which claims the benefit under 35 U.S.C. § 119(e) of priority to U.S. Provisional Patent Application No. 62/333,128, filed May 6, 2016, Provisional Patent Application No. 62/332,234, filed May 5, 2016, and Provisional Patent Application No. 62/158,940, filed May 8, 2015 as well as relates to and claims the benefit under 35 U.S.C. § 119(e) of priority to U.S. Provisional Patent Application No. 62/169,689 filed 2 Jun. 2015, each of which are hereby incorporated by reference in their entirety for all purposes as if fully set forth herein.

BACKGROUND OF THE INVENTION

Field of the Invention

Embodiments of the present invention relate, in general, to estimation of an object's position and more particularly to mobile localization using sparse using time-of-flight ranges and dead reckoning.

Relevant Background

Service providers of all types have begun to recognize that positioning services (i.e., services that identify the position of an object, wireless terminal or the like) may be used in various applications to provide value-added features. A service provider may also use positioning services to provide position-sensitive information such as driving directions, local information on traffic, gas stations, restaurants, hotels, and so on. Other applications that may be provided using positioning services include asset tracking services, asset monitoring and recovery services, fleet and resource management, personal-positioning services, autonomous vehicle guidance, conflict avoidance, and so on. These various applications typically require the position of each affected device be monitored by a system or that the device be able to continually update its position and modify its behavior based on its understanding of its position.

Various systems may be used to determine the position of a device. One system uses a map network stored in a database to calculate current vehicle positions. These systems send distance and heading information, derived from either GPS or dead reckoning, to perform map matching. In other versions Light Detection and Ranging (LiDAR) data and Simultaneous Localization and Mapping (SLAM) are used to identify features surrounding an object using lasers or optics. Map matching calculates the current position based, in one instance, on the network of characteristics stored in a database. Other maps can also be used such as topographical maps that provide terrain characteristics or maps that provide a schematic and the interior layout of a building. These systems also use map matching to calibrate other sensors. Map matching, however, has inherent inaccuracies because map matching must look back in time and match historical data to observed characteristics of a position. As such, map matching can only calibrate the sensors or serve as a position determining means when a position is identified on the map. If a unique set of characteristics cannot be found that match the sensor's position in an existing database, the position derived from this method is ambiguous. Accordingly, on a long straight stretch of highway or in a region with minimal distinguishing geologic or structural features, sensor calibration or position determination using map matching may not occur for a significant period of time, if at all.

Dead reckoning is another means by which to determine the position of a device. Fundamentally, dead reckoning is based on knowing an object's starting position and its direction and distance of travel thereafter. Current land-based dead reckoning systems use an object's speed sensors, rate gyros, reverse gear hookups, and wheel sensors to "dead reckon" the object position from a previously known position. Dead reckoning is susceptible to sensor error and to cumulative errors from aggregation of inaccuracies inherent in time-distance-direction measurements. Furthermore, systems that use odometers and reverse gear hookups lack portability due to the required connections. Moreover, the systems are hard to install in different objects due to differing odometers' configurations and odometer data varies with temperature, load, weight, tire pressure and speed. Nonetheless, dead reckoning is substantially independent of environmental conditions and variations.

A known way of localizing a robot involves "trilateration", which is a technique that determines position based on distance information from uniquely-identifiable ranging radios. Commonly, the robot also has a form of odometer estimation on board as well, in which case the ranges and odometer can be fused in a Kalman filter. However, over large periods of time the vehicle odometer cannot be trusted on its own. As such, what is really desired from the ranging radios is not a localization estimate, but a correction that can be applied to the odometer frame of reference to bring it inline with that of the actual robot's position. This transform should vary slowly over time, as such it can be assumed as a constant.

Current ranging-radio localization techniques will have a difficult time scaling to multiple vehicles or persons in the same area because of bandwidth limits. Current technology requires upwards of 40 Hz range updates from at least four ranging radios to give precise estimates of global frame motion. This alone is nearly at the update limit of the technology. Fewer required ranging radios (no trilateration) and significantly lower update rates will allow the technology to expand to environments with many more objects localized.

The most well know positioning system is the Global Navigation Satellite System (GNSS), comprised of the United States' Global Positioning System (GPS) and the Russian Federation's Global Orbiting Navigation Satellite System (GLONASS). A European Satellite System is on track to join the GNSS in the near future. In each case these global systems are comprised of constellations of satellites orbiting the earth. Each satellite transmits signals encoded with information that allows receivers on earth to measure the time of arrival of the received signals relative to an arbitrary point in time. This relative time-of-arrival measurement may then be converted to a "pseudo-range". The position of a satellite receiver may be accurately estimated (to within 10 to 100 meters for most GNSS receivers) based on a sufficient number of pseudo-range measurements.

GPS/GNSS includes Naystar GPS and its successors, i.e., differential GPS (DGPS), Wide-Area Augmentation System (WAAS), or any other similar system. Naystar is a GPS system which uses space-based satellite radio navigation, and was developed by the U.S. Department of Defense. Naystar GPS consists of three major segments: space, control, and end-user segments. The space segment consists of a constellation of satellites placed in six orbital planes above the Earth's surface. Normally, constellation coverage provides a GPS user with a minimum of five satellites in view from any point on earth at any one time. The satellite broadcasts a RF signal, which is modulated by a precise ranging signal and a coarse acquisition code ranging signal to provide navigation data. This navigation data, which is computed and controlled by the GPS control segment for all GPS satellites, includes the satellite's time, clock correction and ephemeris parameters, almanac and health status. The user segment is a collection of GPS receivers and their support equipment, such as antennas and processors which allow users to receive the code and process information necessary to obtain position velocity and timing measurements.

Unfortunately, GPS may be unavailable in several situations where the GPS signals become weak, susceptible to multi-path interference, corrupted, or non-existent as a result of terrain or other obstructions. Such situations include urban canyons, indoor positions, underground positions, or areas where GPS signals are being jammed or subject to RF interference. Examples of operations in which a GPS signal is not accessible or substantially degraded include both civil and military applications, including, but not limited to: security, intelligence, emergency first-responder activities, and even the position of one's cellular phone.

In addition to GPS-type trilateration schemes another trilateration technique involves the use of radio frequency (RF) beacons. The position of a mobile node can be calculated using the known positions of multiple RF reference beacons (anchors) and measurements of the distances between the mobile node and the anchors. The anchor nodes can pinpoint the mobile node by geometrically forming four or more spheres surrounding the anchor nodes which intersect at a single point that is the position of the mobile node. Unfortunately, this technique has strict infrastructure requirements, requiring at least three anchor nodes for a 2D position and four anchor nodes for a 3D position. The technique is further complicated by being heavily dependent on relative node geometry and suffers from the same types of accuracy errors as GPS, due to RF propagation complexities.

Many sensor networks of this type are based on position measurements using such techniques which measure signal differences—differences in received signal strength (RSS), signal angle of arrival (AoA), signal time of arrival (ToA) or signal time difference of arrival (TDoA)—between nodes, including stationary anchor nodes. Ambiguities using trilateration can be eliminated by deploying a sufficient number of anchor nodes in a mobile sensor network, but this method incurs the increased infrastructure costs of having to deploy multiple anchor nodes.

Inertial navigation units (INUs), consisting of accelerometers, gyroscopes and magnetometers, may be employed to track an individual node's position and orientation over time. While essentially an extremely precise application of dead reckoning, highly accurate INUs are typically expensive, bulky, heavy, power-intensive, and may place limitations on node mobility. INUs with lower size, weight, power and cost are typically also much less accurate. Such systems using only inertial navigation unit (INU) measurements have a divergence problem due to the accumulation of "drift" error—that is, cumulative dead-reckoning error, as discussed above—while systems based on inter-node ranging for sensor positioning suffer from flip and rotation ambiguities.

Many navigation systems are hybrids which utilize a prescribed set of the aforementioned position-determining means to locate an object's position. The positioning-determining means may include GPS, dead reckoning systems, range-based determinations and map databases, but each is application-specific. Typically, one among these systems will serve as the primary navigation system while the remaining position-determining means are utilized to recalibrate cumulative errors in the primary system and fuse correction data to arrive at a more accurate position estimation. Each determining means has its own strengths and limitations, yet none identifies which of all available systems is optimized, at any particular instance, to determine the object's position.

The prior art also lacks the ability to identify which of the available positioning systems is unreliable or has failed and which among these systems is producing, at a given instant in time, the most accurate position of an object. Moreover, the prior art does not approach position estimation from a multimodal approach, but rather attempts to "fuse" collected data to arrive at a better—but nonetheless, unimodal— estimation. What is needed is an Adaptive Positioning System that can analyze data from each of a plurality of positioning systems and determine—on an iterative basis— which systems are providing the most accurate and reliable positional data, to provide a precise, multimodal estimation of position across a wide span of environmental conditions. Moreover, a need further exists to modify an object's behavior to accommodate the path- and speed-dependent accuracy requirements of certain positioning systems' position data. Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the appended claims.

SUMMARY OF THE INVENTION

Features of the adaptive localization system of the present invention includes mobile localization (i.e., position determination) of an object using sparse time-of-flight data and dead reckoning. Mobile localization of an object positional frame of reference using sparse time-of-flight data and dead reckoning is accomplished, according to one embodiment of the present invention by creating a dead reckoning local frame of reference wherein the dead reckoning local frame of reference includes an estimation of localization (position) of the object with respect to known locations of one or more Ultra Wide Band (UWB) transceivers. As the object moves along its desired path the method, using the dead reckon local frame of reference, determines when the estimation of location of the object is within a predetermine range of one or more of the Ultra Wide Band transceivers. Thereafter a conversation is initiated with the one or more of the Ultra Wide Band transceivers within the predetermined range. Upon receiving a signal from the one or more UWB transceivers within the predetermined range the object collects range data between the object and the one or more UWB transceivers. Using multiple conversations to establish accurate range and bearing information the localization system updates the object positional frame of reference based on the collected range data.

According to another embodiment of the present invention a system for mobile localization of an object having an object positional frame of reference using sparse time-of-flight data and dead reckoning includes one or more transmitters and a dead reckoning module wherein the dead reckoning module creates a dead reckoning local frame of reference. With the dead reckoning frame of reference established, a time-of-flight module, responsive to the object being within range of one or more transmitters based on the dead reckoning local frame of reference, establishes a conversation with a transmitter to collect range data between the object and the transmitter. Using this range data a localization module—which is communicatively coupled to the dead reckoning module and the time-of-flight module—updates the object positional frame of reference based on the collected data.

Other features of an Adaptive Positioning System (APS) of the present invention synthesize one or more unimodal positioning systems by utilizing a variety of different, complementary methods and sensor types to estimate the multimodal position of the object as well as the health/performance of the various sensors providing that position. Examples of different sensor types include: 1) GPS/GNSS; 2) dead-reckoning systems using distance-time-direction calculations from some combination of wheel encoders, inertial sensors, compasses, tilt sensors and similar dead-reckoning components; 3) optical, feature-based positioning using some combination of lasers, cameras, stereo-vision systems, multi-camera systems and multispectral/hyperspectral or IR/thermal imaging systems; 4) range-based positioning using some combination of peer-to-peer (P2P), active-ranging systems, such as P2P ultra-wideband radios, P2P ultra-low-power Bluetooth, P2P acoustic ranging, and various other P2P ranging schemes and sensors. 5) Radar-based positioning based on some combination of sensors such as Ultra-Wideband (UWB) radar or other forms of radar, and various other sensor types commonly used in position determination.

Most individual sensors have limitations that cannot be completely overcome. The embodiments of the present invention discussed below provide a way to mitigate individual sensor limitations through use of an adaptive positioning methodology that evaluates the current effectiveness of each sensor's contribution to a positional estimation by iteratively comparing it with the other sensors currently used by the system. The APS creates a modular framework in which the sensor data is fully utilized when it is healthy, but that data is ignored or decremented in importance when it is not found to be accurate or reliable. Additionally, when a sensor's accuracy is found to questionable, other sensors can be used to determine the relative health of that sensor by reconciling errors at each of a plurality of unimodal positional estimations.

APS provides a means to intelligently fuse and filter disparate data to create a highly reliable, highly accurate positioning solution. At its core the APS is unique because it is designed around the expectation of sensor failure. The APS is designed to use commonly-used sensors, such as dead reckoning, combined with sub-optimally-utilized sensors such as GPS, with unique sensors, such as Ultra-Wideband (UWB), providing critical redundancy in areas where other sensors fail. Each sensor system provides data to arrive at individual estimations of the position of a plurality of, in one embodiment, "particles". A "particle" is defined as an unimodal positional estimate from a single sensor or set of sensors. The system thereafter uses a multimodal estimator to identify a positional estimation based on the scatter-plot density of the of particles.

The invention assesses the multimodal approach using techniques well known in the art, but it further applies historical data information to analyze which sensors may have failed in their positional estimations as well as when sensor data may be suspect, based on historical failures or degraded operations. Moreover, the present invention uses its understanding of historical sensor failure to modify an object's behavior to minimize degraded-sensor operations and to maximize the accuracy of positional estimation. Current approaches do not offer a systematic means to adapt behavior in response to positioning requirements and/or contingencies. Unlike traditional approaches, APS suggests behavioral modifications or autonomously decides to take action to change behavior to improve positioning or to avoid likely areas of positional degradation.

One key aspect of the present invention is the novel introduction of UWB peer-to-peer ranging in conjunction with the use of UWB depth-imaging radar. Previously, UWB peer-to-peer (P2P) ranging had been used for positioning, but had always suffered from the need for environmental infrastructure. APS employs a systematic combination of UWB P2P ranging and UWB radar ranging to provide a flexible positioning solution that does not depend on coverage of P2P modules within the environment. This is a key advantage for the long-term use of technologies like self-driving cars and related vehicles, especially during the pivotal time of early adoption where the cost and effort associated with introduction of UWB modules into the environment will mean that solutions not requiring complete coverage have a big advantage.

An important aspect of the Adaptive Positioning System is the ability to use radar depth imagery to provide a temporal and spatial context for reasoning about position within the local frame of reference. This complements various other means of P2P ranging, such as the use of UWB modules to establish landmarks. Other examples of P2P ranging include acoustical ranging, as well as a variety of other time-of-flight and/or time-of-arrival techniques. These P2P ranging methods are very useful for removing error in the positioning system, but they are only useful when they are available. In contrast, the depth image from the UWB Radar Depth Imagery System (URDIS) can make use of almost any feature already existing in the environment. The function of this URDIS technology will be further discussed in the invention description section that follows.

URDIS allows the APS system to reference organic, ubiquitous features in the world either as a priori contextual backdrops or as recent local-environment representations that can be used to reduce odometric drift and error until the next active landmark (i.e. another UWB module) can be located. Even if no other active landmark is identified, the use of URDIS and other UWB-radar systems offer the potential for dramatic improvements in positioning.

This method combines the benefits of a stereo-vision system with the benefits of LiDAR, but with the added advantage that because it uses UWB signals, it does not have line-of-sight limitations. This differentiates the current invention from strategies employing cameras or LiDAR because the latter are limited to line-of-sight measurements. With cameras and LiDAR, obstacles such as crowds of people, snow drifts, stacks of palettes, etc., obscure the view of would-be environmental landmarks and features. Worse, naturally-occurring obscurants such as rain, snow, fog and even vegetation further limit cameras and LiDAR.

Traditional approaches that try to match the current view of the environment to a pre-made map can be easily rendered useless by these obstacles/obscurants, but the proposed method of using a UWB Radar depth image allows APS to reference a much broader range of features and to locate these features even within cluttered and dynamic areas. By using UWB P2P ranging together with UWB depth-radar ranging, APS is able to leverage the benefits of active landmarks at known positions while at the same time producing accurate positioning results over long stretches in between those known landmarks by using UWB radar to positively fix organic, readily available features, all without the need for infrastructure changes to the environment.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

Figure 1:
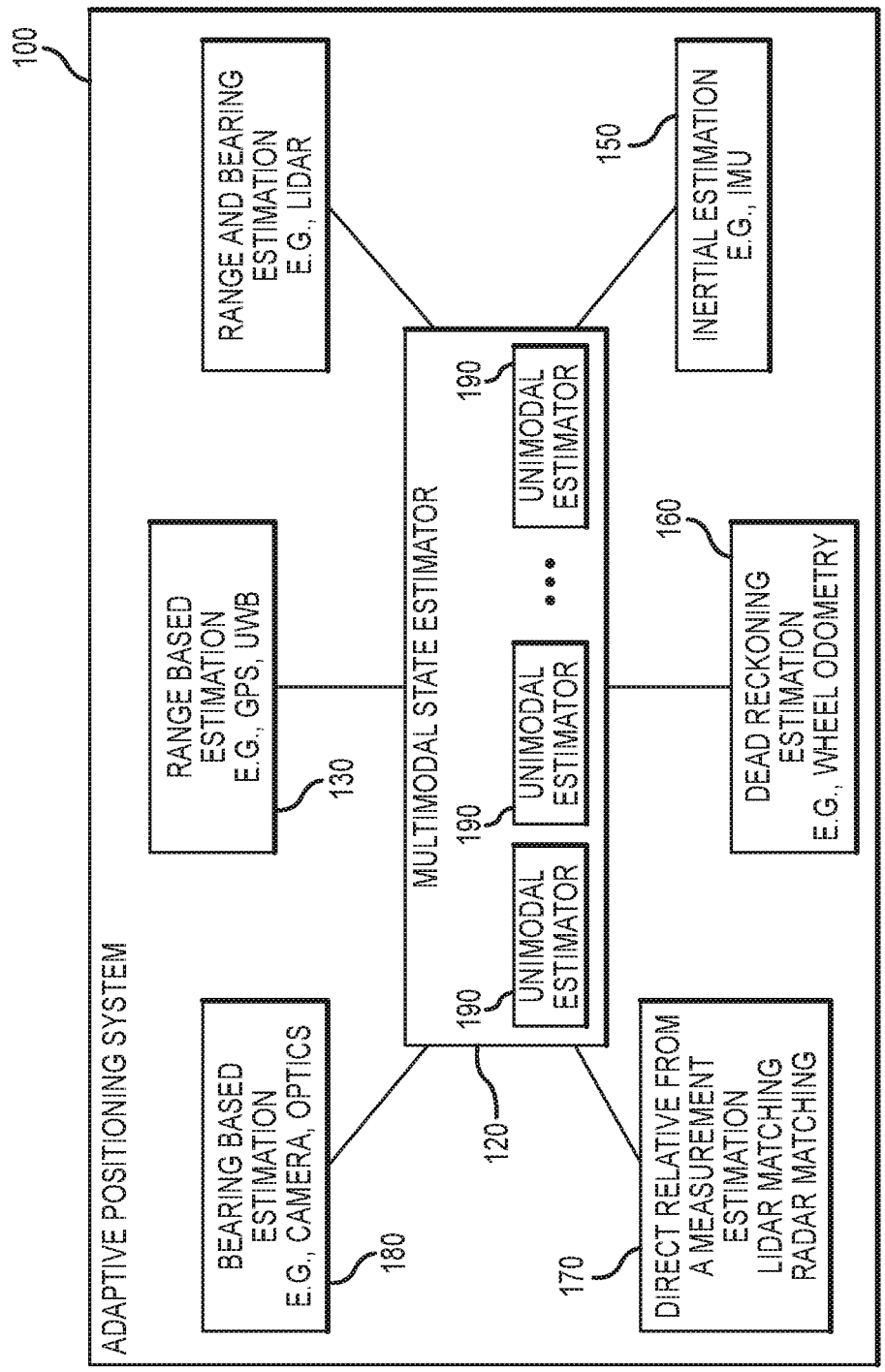
FIG. 1 shows a high-level block diagram illustrating components of an Adaptive Positioning System according to one embodiment of the present invention.

The Figures depict embodiments of the present invention for purposes of illustration only. One skilled in the art will readily recognize from the following discussion that alternative embodiments of the structures and methods illustrated herein may be employed without departing from the principles of the invention described herein.

DESCRIPTION OF THE INVENTION

An Adaptive Positioning System (APS) synthesizes a plurality of positioning systems by employing a variety of different, complementary methods and sensor types to estimate the position of the object while at the same time assessing the health/performance of each of the various sensors providing positioning data. All positioning sensors have particular failure modes or certain inherent limitations which render their determination of a particular position incorrect. However, these failure modes and limitations can be neither completely mitigated nor predicted. The various embodiments of the present invention provide a way to mitigate sensor failure through use of an adaptive positioning method that iteratively evaluates the current effectiveness of each sensor/technique by comparing its contribution to those of other sensors/techniques currently available to the system.

The APS of the present invention creates a modular framework in which the sensor data from each sensor system can, in real time, be fully utilized when it is healthy, but also ignored or decremented when it is not found to be inaccurate or unreliable. Sensors other than the sensor being examined can be used to determine the relative health of the sensor in question and to reconcile errors. For example, obscurants in the air such as dust, snow, sand, fog and the like make the positioning determination of an optical-based sensor suspect; in such a case that sensor's data should be discarded or used with caution.

In contrast, Ultra Wide Band (UWB) ranging and radar are unaffected by obscurants, though each may experience interference from strong electromagnetic signals in the environment. The Adaptive Positioning System of the present invention provides a means to intelligently fuse and filter this disparate data to create a highly reliable, highly accurate positioning solution. At its core, the APS is designed around the expectation of sensor failure. The APS is designed to varyingly combine commonly-used positional sensor estimations, such as those derived from dead reckoning, GPS and other unique sensors such as Ultra-Wideband (UWB) sensors—all of which provide critical redundancy in areas where unimodal-only systems fail—to arrive at a plurality of unimodal positional estimations for an object. Each of these estimations feeds into a multimodal estimator that analyzes the relative density of unimodal estimations to arrive at a likely position of the object. The process is iterative, and in each instant of time not only may each unimodal estimate vary, but the multimodal estimation may vary, as well.

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Like numbers refer to like elements throughout. In the figures, the sizes of certain lines, layers, components, elements or features may be exaggerated for clarity.

The terminology used herein is for the purpose of describing particular embodiments only and is not intended to be limiting of the invention. As used herein, the singular forms "a", "an", and "the" are intended to include the plural forms as well, unless the context clearly indicates otherwise. Thus, for example, reference to "a component surface" includes reference to one or more of such surfaces.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

In the interest of clarity, and for purposes of the present invention, "unimodal" is a probability distribution which has a single mode. A normal distribution is unimodal. As applied to the present invention a unimodal positional estimate is one that a single or unified estimation of the position of an object. Sensor data from a plurality of sensors may be fused together to arrive at a single, unimodal estimation.

In contrast "multimodal" is characterized by several different modes of activity or occurrences. In this case positional estimations using a multimodal approach receive inputs from a plurality of modalities that increases usability. In essences the weakness or failure of one modality are offset by the strengths of another.

The present invention relates in general to positional estimation and more particular to estimation of the position of an object. Frequently the object is a device, robot, or mobile device. In robotics, a typical task is to identify specific objects in an image and to determine each object's position and orientation relative to some coordinate system. This information can then be used, for example, to allow a robot to manipulate an object or to avoid moving into the object. The combination of position and orientation is referred to as the "pose" of an object, even though this concept is sometimes used only to describe the orientation. Exterior orientation and Translation are also used as synonyms to pose The specific task of determining the pose of an object in an image (or stereo images, image sequence) is referred to as pose estimation. The pose estimation problem can be solved in different ways depending on the image sensor configuration, and choice of methodology.

It will be also understood that when an element is referred to as being "on," "attached" to, "connected" to, "coupled" with, "contacting", "mounted" etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve the manipulation of information elements. Typically, but not necessarily, such elements may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," "words", or the like. These specific words, however, are merely convenient labels and are to be associated with appropriate information elements.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention.

One aspect of the present invention is to enhance and optimize the ability to estimate an object's position by identifying weaknesses or failures of individual sensors and sensor systems while leveraging the position-determining capabilities of other sensor systems. For example, the limitations of GPS-derived positioning in urban areas or outdoor areas with similar line-of-sight limitations (e.g., mountainous areas, canyons, etc.) can be offset by range information from other sensors (e.g., video, radar, sonar, laser data, etc.). According to one embodiment of the present invention, laser sensing—via LIDAR—can be used to fix positions using prominent and persistent topographic features, enabling APS to validate other systems' inputs and to enhance each system's accuracy. Even so, LIDAR is limited by the requirement for topography or other environmental features prominent enough and identifiable enough from which to fix an accurate LIDAR position. Thus other sensor systems are likewise incorporated into APS. By feeding the enhanced position estimate into a real-time map-matching algorithm, APS can enhance sensor data elsewhere within the system and can also use the enhance position estimate to identify real-time changes in the environment. APS can then adjust according to these real-time changes, to improve perception and to provide reactive behaviors which are sensitive to these dynamic environments.

As previously discussed, dead reckoning uses a combination of components to track an object's position. The position will eventually degrade, however, over long distances, as a result of cumulative errors inherent in using dead-reckoning methodology. Using the concepts of APS, errors in dead reckoning can be mitigated, somewhat, by using, among other things, inertial sensors, in addition to traditional compass data. Dead reckoning thus complements GPS and other positioning capabilities, enhancing the overall accuracy of APS. As with GPS and laser positioning, enhanced dead reckoning can improve detection and mapping performance and increase the overall reliability of the system.

Another aspect of the present invention is the use of one or more active position ultra wide band (UWB) transceivers or tags. Active tag tracking is not limited to line of sight and is not vulnerable to jamming. These ultra wide-band (UWB) radio frequency (RF) identification (ID) tag systems (collectively RFID) comprise a reader with an antenna, a transmitter, and software such as a driver and middleware. One function of the UWB RFID system is to retrieve state and positional information (ID) generated by each tag (also known as a transponder). Tags are usually affixed to objects so that it becomes possible to locate where the goods are without a direct line-of-sight given the low frequency nature of their transmission. A tag can include additional information other than the ID. For example, using triangulation of the tag's position and the identity of a tag, heading and distance to the tag's position can be ascertained. A single tag can also be used as a beacon for returning to a specific position or carried by an individual or vehicle to affect a follow behavior from other like equipped objects. As will be appreciated by one of reasonable skill in the relevant art, other active ranging technology is equally applicable to the present invention and is contemplated in its use. The use of the term "UWB", "tags" or "RFID tags," or the like, is merely exemplary and should not be viewed as limiting the scope of the present invention.

In one implementation of the present invention, a RFID and/or UWB tag cannot only be associated with a piece of stationary infrastructure with a known, precise, position, but also provide active relative positioning between movable objects. For example, even if the two or more tags are unaware of their precise position that can provide accurate relative position. Moreover, the tag can be connected to a centralized tracking system to convey interaction data. As a mobile object interacts with the tag of a known position, the variances in the object's positional data can be refined. Likewise, a tag can convey not only relative position between objects but relative motion between objects as well. Such tags possess low-detectability and are not limited to line of sight nor are they vulnerable to jamming. And, depending on how mounted and the terrain in which they are implemented, a tag and tracking system can permit user/tag interaction anywhere from 200 feet to a range of up to two miles. Currently, tags offer relative position accuracy of approximately +/−12 cm for each interactive object outfitted with a tag. As will be appreciated by one or reasonable skill in the relevant art, the use of the term object is not intended to be limiting in any way. While the present invention is described by way of examples in which objects may be represented by vehicles or cellular telephones, an object is to be interpreted as an arbitrary entity that can implement the inventive concepts presented herein. For example, an object can be a robot, vehicle, aircraft, ship, bicycle, or other device or entity that moves in relation to another. The collaboration and communication described herein can involve multiple modalities of communication across a plurality of mediums.

The active position tags of the present invention can also provide range and bearing information. Using triangulation and trilateration between tags, a route can be established using a series of virtual waypoints. Tags can also be used to attract other objects or repulse objects creating a buffer zone. For example, a person wearing a tag can create a 4-foot buffer zone which will result in objects not entering the zone to protect the individual. Similarly, a series of tags can be used to line a ditch or similar hazard to ensure that the object will not enter a certain region. According to one or more embodiments of the current invention, multiple ranges between the active position tags can be used to create a mesh network of peer-to-peer (P2P) positioning where each element can contribute to the framework. Each module or object can vote as to its own position and subsequently the relative position of its nearest neighbors. Importantly, the invention provides a means of supplementing the active tags with ranges to other landmarks. Thus when other active modules or objects are not present, not visible or not available, other sensors/modalities of the APS come into play to complement the mesh network.

One novel aspect of the Invention is the use of URDIS modality as part of the dynamic positioning process. Almost every environment has some unique features that are uniquely identifiable with the URDIS sensor and therefore can be used effectively as a reference while the mobile system moves through distance and time. This reference functions in the following ways: a) an a priori characterization of the environment by the URDIS sensor provides a contextual backdrop for positioning; b) an ongoing local environment representation uses the last N depth scans from the URDIS to create a brief temporal memory of the environment that can be used for tracking relative motion and c) the URDIS data can be used for identifying what is changing in the environment which allows those changes to be either added to the local environment map for future positioning purposes or discarded if they continue to move (in which case they are not useful for positioning).

The unique time-coded ultra-wideband radio frequency pulse system of the present invention allows a single module to use multiple antennas to send and receive pulses as they reflect off of the local environment. By using the time coding in each pulse it is possible to differentiate the multi-path reflections. Using several antennae allows the UWB radio to be used as a depth imaging sensor because the differences in the time of flight observed from one antenna to the next allows the system to calculate the shape of the object causing the reflection based on the known positions of the various antennae.

The UWB depth radar provides a means to find invariant features for positioning purposes even when much of the rest of the environment may be moving. This is both because the radio pulses are not limited to line of sight and because the timing accuracy inherent to the UWB time-based approach allows for the careful discrimination of what is moving and changing in the environment. By accurately assessing in real-time what is moving and changing, it becomes much easier to identify the invariant landmarks that should be used for positioning. This ability to use coherent timing inherent to the URDIS data is a key element of the invention as without it the moving vehicle has great difficulty deciding which data identified by range sensors such as cameras and LiDAR will serve as effective landmarks.

The present invention iteratively adapts and determines an object's position by individually assessing each sensor's positional determination. FIG. 1 presents a high level block diagram of an Adaptive Positioning System according to one embedment of the present invention. The APS 100 includes a multimodal positional state estimator 120 which receives positional estimations from a plurality of positional sensors. In one embodiment of the present invention different positional sensors include: 1) range based estimation 130 such as GPS or UWB technology, as well as combinations of peer to peer (P2P) active ranging system such as P2P ultra-wide-band radios, P2P ultra-low power Bluetooth, P2P acoustic ranging, etc.; 2) dead reckoning systems 160 using some combination of wheel encoders, inertial sensors, compasses and tilt sensors; 3) direct relative frame measurement 170 and optical feature-based positioning using some combination of lasers, cameras, stereo vision systems, multi-camera systems and IR/thermal imaging systems; 4) bearing based positional estimations 180 such as trilateration including optical and camera systems; 5) range and bearing estimations 140 such as LiDAR and SLAM; and 6) inertial sensing systems 150 using an inertial measuring unit.

Each of these, and other positional sensor systems, creates, and provides to multimodal state estimator 120, a unimodal estimation 190 of an object's position. According to one aspect of the present invention the APS concurrently maintains each of a plurality of unimodal position estimation to enable the APS to determine which, if any, of the sensor system estimations have failed.

Figure 2:
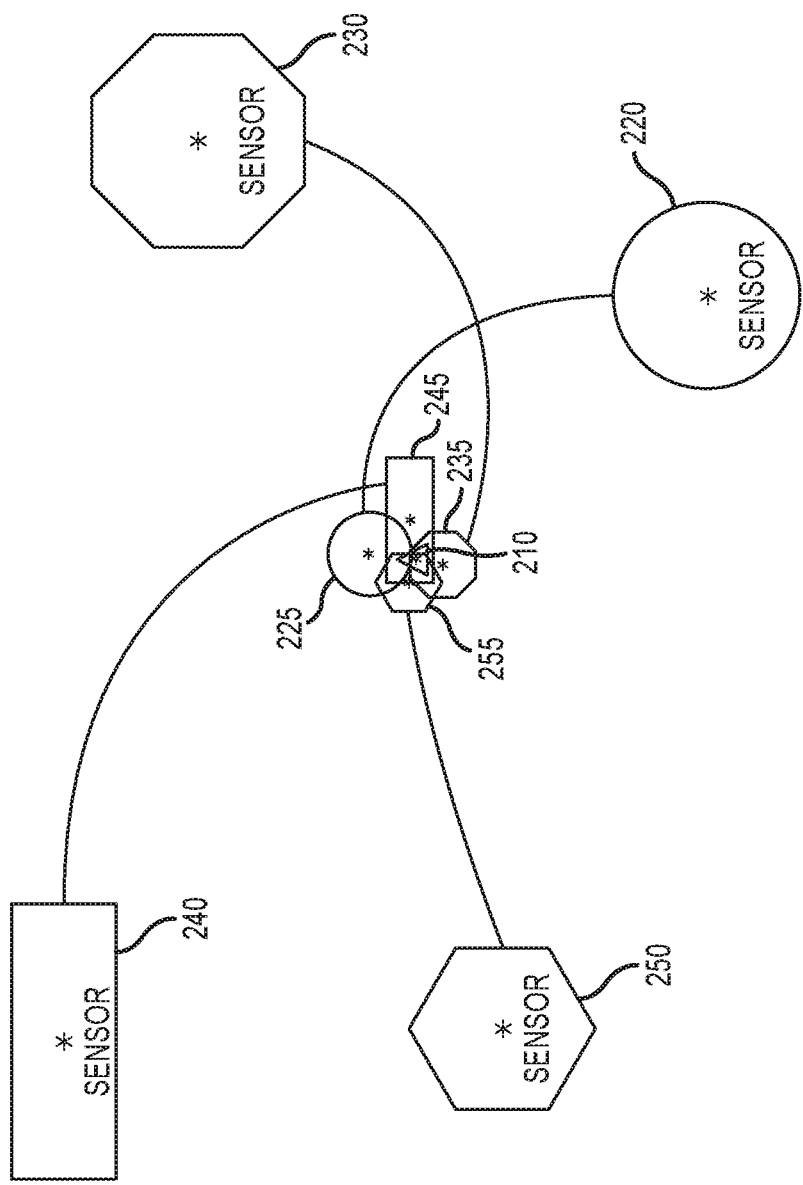
FIG. 2 illustrates one embodiment of a multimodal positional estimation from an Adaptive Positioning System.

FIG. 2 is a graphic illustration of the positional estimation processes of the APS according to one embodiment of the present invention. FIG. 2 represent a positional estimation at an instant of time. As will be appreciated by one skilled in the art, the present invention's estimation of an object's position is iteratively and is continually updated based on determinations by each of a plurality of positional sensors. FIG. 2 represents and APS having four positional sensors. Other versions may have more or fewer means to individually determine an object's position. Each of the sensors shown in figure two is represented by a unique geometric shape. For example, a GPS sensor system may be represented by a circle while a dead reckoning system a rectangle.

The APS of the present invention recognizes that an object's actual position 210 is almost invariably different than the position estimated by one or more positional sensors. In this case the object's actual position 120 is represented by a small dot surrounded by a triangle. The remaining geometric figures represent each sensor's unimodal estimation of the object's position. A first sensor 220, represented by a circle estimates the object's position 225 slight above and to the right of the actual position 210. A second sensor 230 shown as an octagon estimates the position slightly to the right of the actual position 210. Sensor number three 250 shown as a hexagon estimates the position of the object 255 left of is actual position 210 while the last sensor 240 is displaced right 245.

Unlike sensor fusion that would merge all of these estimates into a unified best fit or a combined estimate, the present invention maintains each unimodal estimation and thereafter analyzes the individual estimations to ascertain whether one or more of the sensors has failed in a multimodal field. And upon detection of a failure, that particular estimation is disregarded or degraded.

One aspect of the present invention is that the multimodal state estimation expects that the unimodal estimation derived from one or more sensors will fail. In the interest of clarity sensor failure is when the difference of the estimation of position by a sensor as compared to the other sensor estimates is greater than a predefined deviation limit or covariance. With each estimation by the plurality of sensors a degree of certainty is determined. If a particular sensor's estimation is, for example, two standard deviations apart from the expected position estimate then that sensor may be considered to have failed and its contribution to the positional estimate removed. One skilled in the relevant art will recognize that the deviation level used to establish sensor failure may vary and indeed may dynamically vary based on conditions.

The present invention identifies from various positional sensors different spatial conditions or positional states or particles. By doing so the present invention uses a non-Gaussian state representation. In a Gaussian state, or a single state with sensor fusion, the uncertainty with respect to the object's position is uniformly distributed around where the system thinks the object is located. A Gaussian state, (also referred to as a normal or unimodal state distribution) merges the individual positional determinations to arrive at a combined or best guess of where the object is located. The present invention by contrast merges unimodal or Gaussian state estimation with a non-Gaussian state based on continuous multimodal, discrete binary (unimodal) positions that are compared against each other yet nonetheless remain separate. The present invention outputs a certainty value based on its ability to reconcile multiple modalities. This certainty value can also be used as an input to modify the behavior of an object, such as a robot, tasked to accomplish a specific goal. The object's/robot's behavior is modified in light of the new information as it works to accomplish the goal. When a position estimation has a high degree of uncertainty the system directing the behavior of the object can recognize this and take specific behavioral action. Such modifications to the behavior of an object can result in the object slowing down, turning around, backing up, traveling in concentric circles, leaving an area where uncertainty is high or even remaining still and asking for help.

In one embodiment of the present invention, each of these unimodal estimations, each of which are arrived using a fusion of data collected by a plurality of sensors are treated as particles in a multimodal positional estimation state. A particle filter is then applied to determine a multimodal estimation of the position of the object.

Using a particle filter approach, there is something we desire to know. In this case we desire to know the position of an object. Continuing, we can measure something related to what we want to know. Here we can collect sensor data from a plurality of sensors to arrive at a plurality of positional estimations and we can measure the degree for each positional estimation to which each sensor agrees with the estimation. Thus we can measure the health or fitness of the sensor in its determination of a particular positional estimation. We also understand the relationship between what we want to know, the position of the object, and the measurement or the fitness of a sensor.

Particle filters work by generating a plurality of hypotheses. In our case each unimodal positional estimate is a hypothesis as to the position of the object. They can be randomly generated and have a random distribution. But we have from our unimodal estimations (with some uncertainly) the position of the object on a map.

For each particle, or unimodal estimation we can evaluate how likely it is to be the correct position. Each particle or estimation can be given a weight or fitness score as to how likely it is indeed the position of our object. Of the plurality of particles, unimodal estimations, some are more likely than others to be accurate estimations of the position of the object. The unlikely particles or estimations are not of much use. New particles or estimations are generated but this time they are not random; they are based on the existing particles or estimations. Thus the particles are resampled in order to evolve most fit particles and still maintain uncertainty by letting a few less fit particles pass through every iteration of filter.

The new sample or generation of particles is based on a model of where we think the object is located or has moved. Again the weights or fitness of each particle (estimation) is updated and resampling occurs. The particles are again propagated in time using the model and the process repeats.

One embodiment of the present invention uses each positional state with a fitness score as a particle and thereafter applies particle filters. An algorithm places a score as to the fitness of each sensor's ability to estimate the position of the object by way of a particle. A state of a particle represents the position of (x, y, z, roll, pitch, yaw) of the object. Particle filters will spawn numerous (hundreds/thousands) of these particles which then individually estimate each new state when a new sensor reading is observed and then individually calculates their respective new states. With the information about new states, each particle is assigned weights by a specific cost criterion for that sensor and only the fittest particles survive an iteration. This approach allows multimodal state estimation where (as an example) 80% of amassed particles will contribute to the most certain position of the object while others can be at a different position. Hence, the density of these particles governs the certainty of the state the robot is in using a particle filter approach.

Particle filter methodology is often used to solve nonlinear filtering problems arising in signal processing and Bayesian statistical inference. The filtering problem consists in estimating the internal states in dynamical systems when partial observations are made, and random perturbations are present in the sensors as well as in the dynamical system. The objective is to compute the conditional probability (a.k.a. posterior distributions) of the states of some Markov process, given some noisy and partial observations.

Particle filtering methodology uses a genetic type mutation-selection sampling approach, with a set of particles (also called individuals, or samples) to represent the posterior distribution of some stochastic process given some noisy and/or partial observations. The state-space model can be nonlinear and the initial state and noise distributions can take any form required. Particle filter techniques provide a well-established methodology for generating samples from the required distribution without requiring assumptions about the state-space model or the state distributions.

One particular technique used by the present invention is a Rao-Blackwellized Particle Filter (RBPF). RBPF is specific type of particle filter algorithm that allows integration of unimodal and multimodal type systems. According to one embodiment of the present invention, a unique state set is defined for the particles of the filter (sensor failure modes are a state of the particle so that particle can predict failure modes and also drive down the weight for the particle to survive). In most cases, RBPF is used for estimating object state(s) using one type of sensor input, and can be used, as in the case of the present invention, with multiple types of sensors feeding into the same estimation system for tighter coupling and more robust failure detection of any particular sensor.

Figure 3:
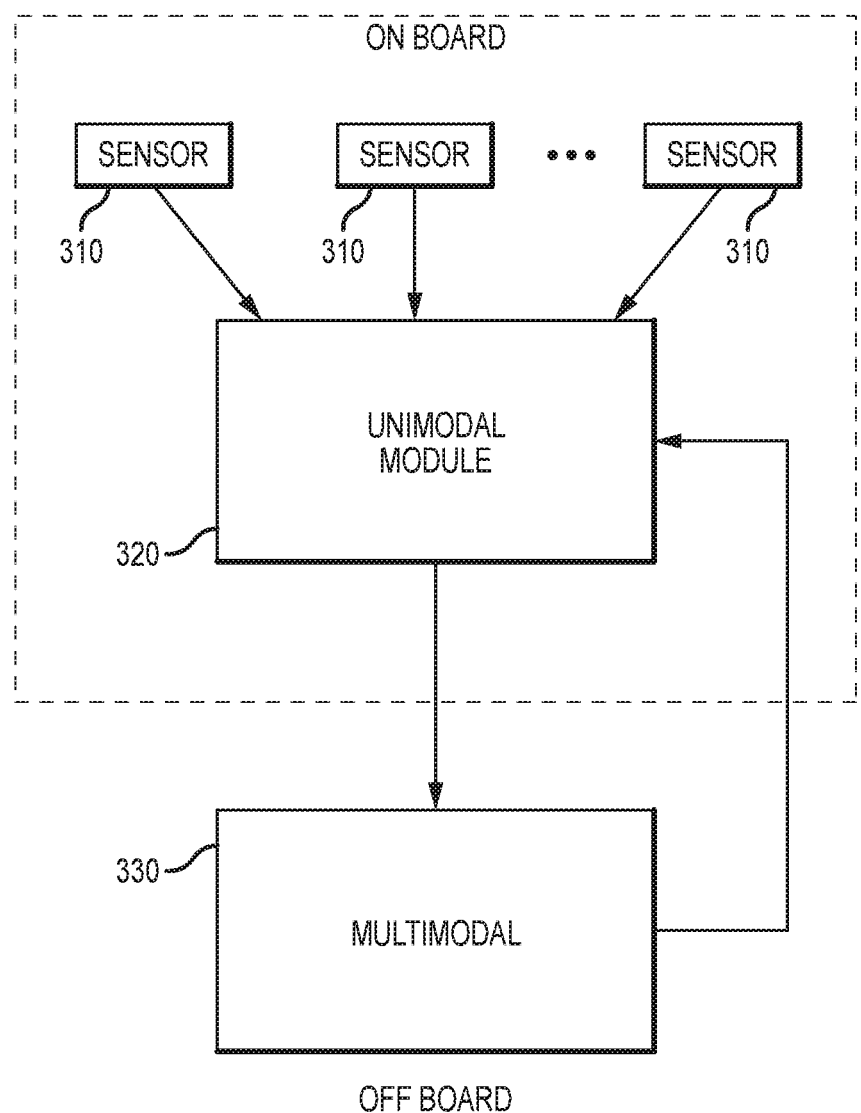
FIG. 3 shows a high-level block diagram of a multimodal estimator and a unimodal estimator as applied within an Adaptive Positioning System.

In addition to assessing the state of each positional sensor the present invention utilizes various schemes to enhance the multimodal positional estimation of an object. FIG. 3 shows a high level architecture of one embodiment of the present invention. The invention utilizes, in one embodiment, a distributed positioning setup in which a multimodal module 330 receives inputs and updates from an onboard unimodal estimator 320. The unimodal estimator 320 receives separately positional estimations from each of a plurality of sensors 310. Using data received from the unimodal estimator 320 the multimodal estimator 330 can provide corrections to processing ongoing in the unimodal estimator 320. For example, if it determined by the multimodal estimator 330 that a GPS sensor is experiencing degraded accuracy due to multipath or interference the multimodal estimator 330 can convey such information to the unimodal estimator that RF reception generally appears degraded. Accordingly, the unimodal estimator may devalue or degrade the positional estimation of UWB or other sensors that similar in operation to the GPS sensor. This data is then used to update a sensor's probability of failure or degraded operation (defined a sensor "heatmap") from prior information for future position evaluations. Thus, each particle can use noisy sensor data to estimate its location using history from the sensor heatmap.

The presentation invention also uses range measurements to both moving and stationary positioning landmarks as long as the position of the landmark is known. One element of the invention is that even when no fixed landmark is within view (or perhaps not even present at all), the presence of moving landmarks (e.g. other cars and trucks, other robots, other mobile handheld devices) can serve to provide positioning references. Each of these can contribute to a coherent position estimate for the group. In this scheme each module/entity is essentially given a vote on its own position and each module can also contribute to a collaborative assessment of the validity of other modules position estimates. The APS dynamically balances dependence on active range modules (i.e. UWB active ranging tags) with the use of passive landmarks (i.e. RFID tags), and organic features (i.e. an actual natural landmark or obstacle) that can be perceived through use of LiDAR, cameras, radar, etc. APS can use all of these or any combination and provides a systematic means for combining the ranges to these various landmarks.

Each category of landmark has a filtering mechanism specific to that category. After the filtering is finished the value of each range estimate can be determined by comparing multiple estimates. There are multiple steps to ascertaining the value of each estimate: a) comparison to previous N recent range readings from the particular sensor (once adjusted as per recent motion); b) comparison to previous M recent range readings from the particular sensor category (once adjusted as per recent motion).; c) comparison between disparate landmark categories. The current invention provides a standardized means for incorporating all this disparate information without needing to modify the algorithm. The operational benefit is that a single system can utilize a spectrum of different landmarks depending on the environment, situation and the type of vehicle. Another advantage is that environmental obscurants or obstacles which interfere with one type of landmark (i.e. visual) will not interfere with others (UWB tag).

Another scheme can be using range based measurements to fixed but known position landmarks using 2D scans but preferably will involve depth imagery as it is much more useful for calculating position and especially orientation. Input for this category can come from 2D or 3D RADAR depth imagery, LiDAR 2D or 3D scans, 2D or 3D stereo vision data and any other means that provides a 2D or 3D depth image that can be used for positioning. Of these, the use of UWB depth imagery represents an important component to the APS and is innovative as a component to positioning in general. All of the depth imagery is filtered against previous depth imagery just as was the case for the range-based positioning (discussed in the previous section).

Within the depth imagery category, each sensor modality has an appropriate filtering mechanism tailored to that modality (i.e. LiDAR, UWB Radar, stereo vision, etc.). After the filtering is finished a map matching algorithm is used to match the current scan into a semi-permanent 3D model of the local environment. The output is also fed into one or more separate map-matching modules that can then use the enhanced position estimate to detect change, based on contrasting the new scans with enhanced positions against the existing map. This is essentially a form of rolling spatial memory used to track motion and orientation on the fly, identify objects moving in the environment and calculate the validity of each new depth image. The validity of each new depth image can be determined in a number of ways: a) comparison to previous N recent depth scans from the particular sensor once adjusted as per recent motion; b) comparison to previous M recent depth scans from the particular sensor category (e.g. LiDAR, Stereo vision, UWB radar depth imagery sensor) once adjusted as per recent motion).; c) comparison of depth image to other modalities. Thus, the current invention provides a standardized means for incorporating all this disparate depth imagery without needing to modify the APS algorithm. The operational benefit is that a single system can utilize a spectrum of different landmarks depending on the environment, situation and the type of vehicle. Another advantage is that environmental obscurants or obstacles which interfere with the use of one depth scan (i.e. vegetation that obstructs a LiDAR) will not interfere with others (i.e. UWB radar depth imagery system can see through vegetation).

The use of map matching over multiple time steps allows APS to calculate changes in 2D or 3D motion and orientation in reference to the persistent 3D model. Also, in the face of positioning uncertainty, APS can evaluate positioning hypotheses within the temporal and spatial context of the ongoing 3D depth image. Thus, APS provides a way to combine depth imagery from different sensor modalities into a single approach. Just as multiple sensor modalities can produce peer to peer ranges within the APS (see previous section), it is also possible for multimodal 3D depth images to be incorporated by the APS system. The multimodal estimator can use range and bearing measurements of a LiDAR system simultaneously with landmark positional estimates from SLAM and from the UWB radar depth imagery. 2D or 3D "fiducially" ("fiducials" are defined as artificial targets selected and used based on their ability to be easily detected within the depth imagery) can be located in the environment can be used to further feature identification. Just as active tags provide a guaranteed means to do peer to peer ranging (see the previous section), the fiducials provide a means to facilitate motion estimation and positioning based on the depth imagery.

Dead reckoning is a module within the APS scheme algorithms. This module is distinct from the map-matching and range-based modules but within the APS framework it is able to use the position and motion estimates outputted by the other modules in order to identify errors and improve accuracy. The dead reckoning module fuses and filters wheel encoders, inertial data and compass information to produce an estimate of motion and position. The dead-reckoning module's estimate of motion is usually excellent and updates more quickly and computationally more efficiently than any other module. However, the position estimate of the dead reckoning module, if used independent of the other modules, will drift indefinitely. Consequently, APS uses the motion output of the dead-reckoning module to fill in the temporal and spatial "gaps" which may occur between identified features and landmarks. It also may fill gaps between successful depth image scan matches. This need may occur when features are not available, such as in a wide open field. Also, the output of the dead reckoning module can be accessed by the algorithms for trilateration and map-matching described above. This allows those other modules to recognize certain kinds of sensor failure or erroneous position calculations that can sometimes occur if a landmark is replaced or misplaced or if multiple areas within the environment have similar depth characteristics that introduce uncertainty. Additional schemes can be developed based on sensor capability and characteristics to identify sensor failure and to recalibrate or optimize existing sensor estimations.

As illustrated above the multimodal estimation of the present invention assumes each sensor will, in varying conditions, fail. No sensor provides perfect information. Each sensor's output is an estimation of an object's actual position and the accuracy of that estimation varies. This is distinct from modeling the noise or inaccuracy of the sensor but rather when the estimation is position is simply incorrect. Thus there are conditions in which the sensor has failed and is providing an incorrect position even though there is such no indication. Thus a question becomes when has an estimation, which appears to be sound, failed.

The Multimodal approach of the present invention is a sustained belief that there are several acceptable positions at any one instance of time. The present invention maintains all positional beliefs until evidence eliminates one or more beliefs. Moreover, an iterative process continually reassesses each estimation and the correlation of each estimation to narrow down the options of position using, in one embodiment historical data related to sensor failure or degradation.

Figure 4A:
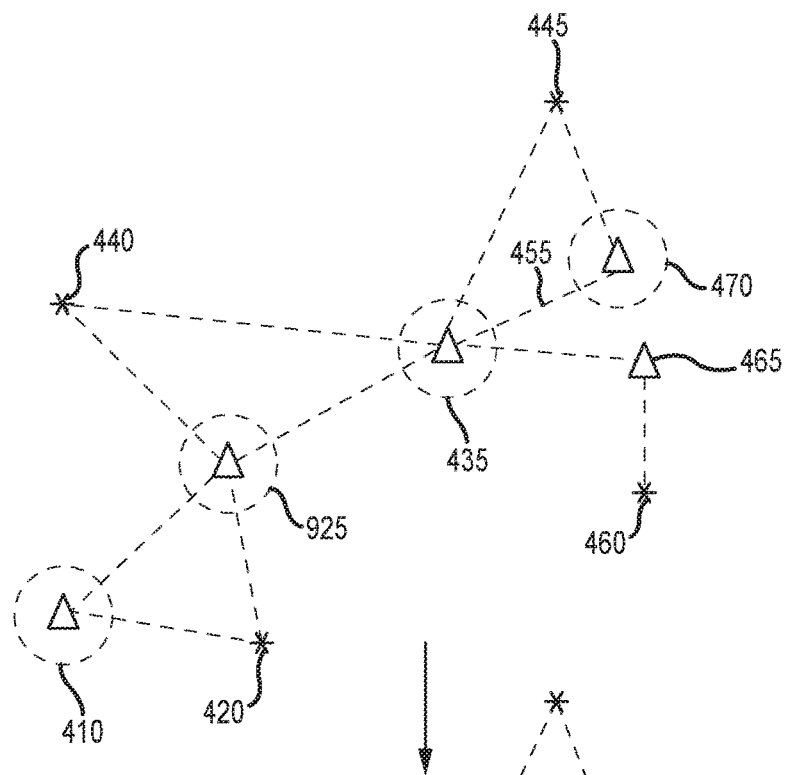
FIGS. 4A and 4B are depictions of multimodal positional estimation including the recognition—and removal from consideration—of a failed sensor, according to one embodiment of the APS.
Figure 4B:
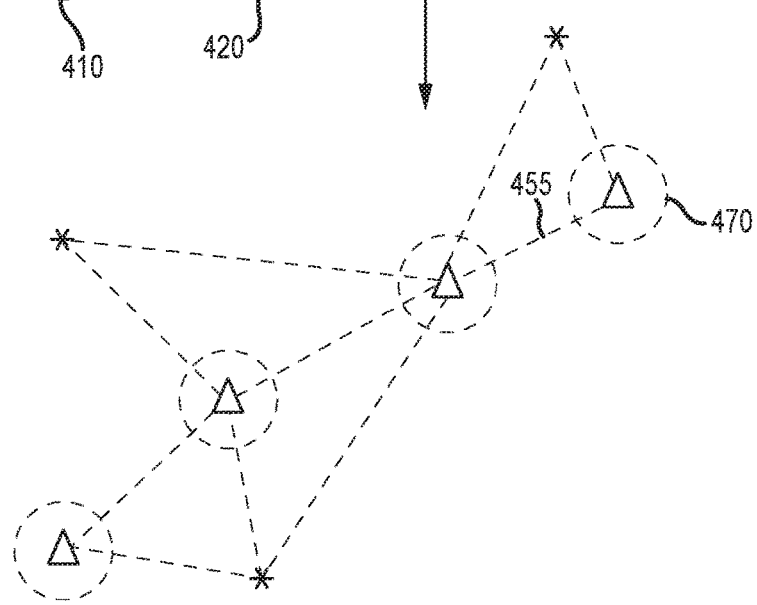

FIGS. 4A and 4B provides a simple rendition of the multimodal estimator's ability to continually assess and resolve sensor failure. FIG. 4 shows historical path of an object 410. The object's position is identified in 4 discrete positions by a plurality of sensors. Initially the position of the object 410 is estimated by the unimodal sensors to be within the depicted circle 415. Along the path exists landmarks or other features that enable one or more sensors to determine the object's position. In this case assume that 4 transmitters 420, 440, 445, 460 are positioned with known positions along the proposed path. At each of the four positions indicated in FIG. 4 the object receives from one or more of these transmitters range and bearing information. One skilled in the relevant art will recognize that in other sensor configurations range only may be provided or that the towers are objects which can be detected using an optical or laser sensor. As the object 410 moves from the first position 415 to the second position 425 the position estimation determined by the two towers is correlated with dead reckoning data. A similar occurrence exits as the object 410 moves from the second position 425 to the third position 435. And while in this depictions the positional estimations are compared at discrete positions, in operation the comparison of various sensor estimations it iterative and continual.

However, as the object moves from the third position 435 to the last position tension within the multimodal estimator is identified. The range and bearing information received from the upper most tower 445, the lower tower 460 and the dead reckoning information do not agree. Two possible solutions 465, 470 are identified which lay outside acceptable tolerances. According to one embodiment of the present invention historical data can assist in maintaining the heath of the system and to identify sensors that have failed and are thereafter devalued. For example, odometer information and the range/bearing information for the object 410 in the third position 435 agreed sufficiently that no tension occurred. For the last position a third source or third positional estimation from the lower tower 460 conflicts with information received from other sensors. Said differently the unimodal estimations differ. The system of the present invention, using historical data, can more favorably consider the dead reckoning data and that from the upper tower 445 rather than the new information from the lower tower 460. Thus the unimodal observation based on data from the lower tower 460 is considered to have failed and is disregarded. Moreover, the present invention can assess historical data that may indicate that when the object is in its current position data from the lower tower 460 is unreliable. The APS system resolves that the upper final position 470 is a more accurate representation of the object's actual position. And the historical heatmap is updated based in this failed sensor.

Historical analysis of positional estimations can assist in the determination of whether a sensor or sensors have failed or are likely to fail if the object is moving toward a particular position. Turning back to the last example, if no historical data had been available each alternative final position 470, 465 would be equally likely. The present invention assesses that is the probability that a particular sensor will fail as well as what is the probability of sensor failure given that another sensor has failed in the past.

Figure 5:
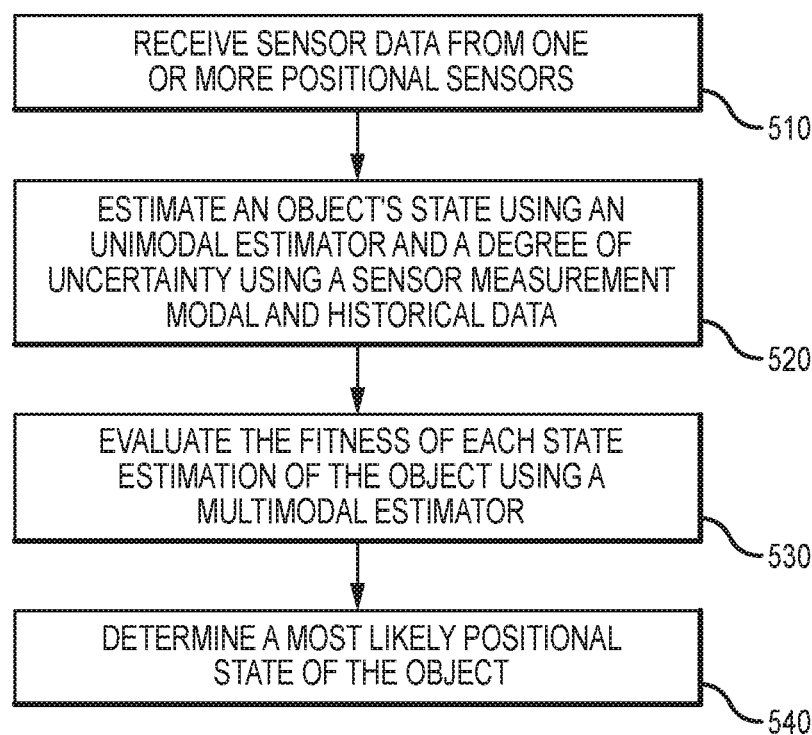
FIG. 5 presents a high-level flowchart for a methodology according to one embodiment of the present invention to combine unimodal and multimodal estimation to determine an object's positions.

FIG. 5 presents a high level flow chart for a methodology according to one embodiment of the present invention to combine unimodal and multimodal estimation to determine an object's positions. The Adaptive Positioning System of the present invention begins by receiving 510 sensor data from a plurality of sensors. Using that information, a unimodal estimation 520 is created of the object's state as well as a degree of uncertainly based on sensor measurements and historical data. For example, each type of sensor may have differing levels of accuracy or the ability to present an object's position. In addition, the certainty of the sensor to provide optimal data may be further reduced based on the object's currently position. Such as a GPS system in an urban environment. There is an inherent uncertainty to the GPS system's ability to provide the object's position and that uncertain is larger based on a historical understanding of its ability to perform in an urban setting.

The present invention thereafter evaluates 530 the fitness of each state estimation using multimodal techniques. One unique aspect of the present invention is to combine unimodal and multimodal positional estimation to provide an accurate and reliable positional estimation. This determination 540 of the most likely positional state of the object is gained by considering the fitness or health of each individual state estimation.

It will be understood by one of reasonable skill in the relevant art that each block of the flowchart illustrations, and combinations of blocks in the flowchart illustrations, can, in one embodiment, be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a non-transitory computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

Figure 6:
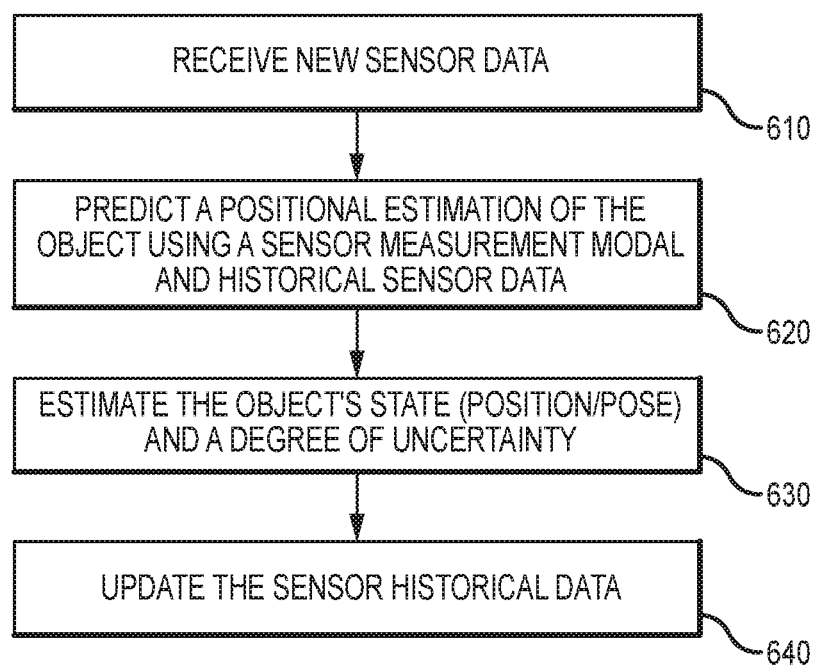
FIG. 6 is a flowchart of a methodology, according to one embodiment of the present invention, for predicting the state of an object using a unimodal estimator.

As suggested above each sensor provides a prediction as to the position of the object. FIG. 6 is a flowchart of a methodology, according to one embodiment of the present invention, for predicting the state of an object using a unimodal estimator. As before the process begins with the object receiving 610 sensor data. Information from a plurality of positional sensors associated with the object can seek and gain information to ascertain the object's position.

Before a positional estimation is determined the APS predicts 620 where the object is likely to be located or its state using measurements models for each sensor and historical data. For example, a dead reckoning sensor system models the object's movement based on speed and time. If the object is, at its last observation, moving at 1 m/s and the new observation is one section later, the APS would predict that the object would have moved 1 meter.

With a prediction in hand the system estimates 630 the position and state of the object as well as any uncertainly that may exist. Turning back to the prior example, the APS expects the object to have moved 1 meter but the new observation estimates that the vehicle has moved 1.1 meters. Uncertainty exist whether the new estimation is correct or whether the prediction is correct. Thus for each positional estimation, historical data is updated 640 and used in future estimation.

Figure 7:
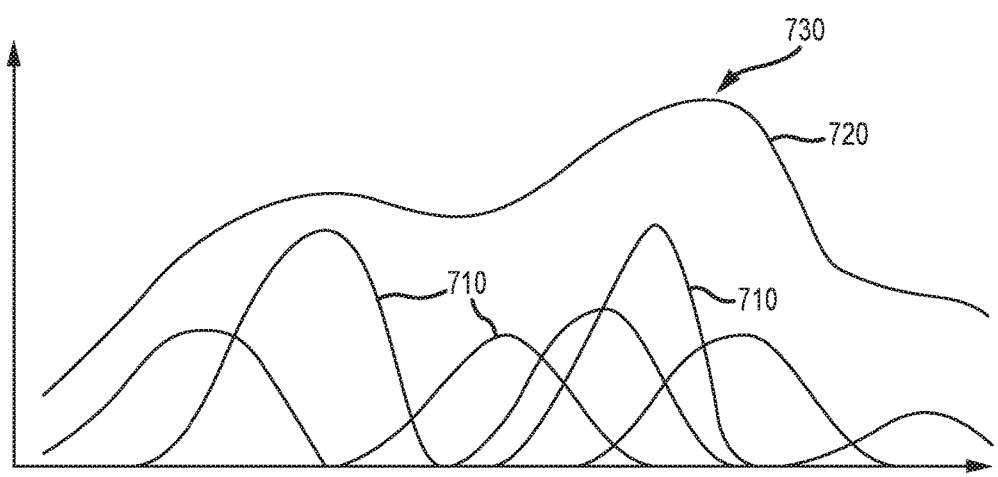
FIG. 7 provides a basic graphical representation of a multimodal approach to adaptive positioning according to one embodiment of the present invention.

Multimodal estimation ties in with the unimodal estimations of sensor data to provide a consensus of where the object is located. FIG. 7 provides a basic graphical representation of a multimodal approach to adaptive positioning according to one embodiment of the present invention. The figure presents a plurality of unimodal positional estimations 710 as would be determined using the processes described herein. Each of the unimodal estimations may represents a positional estimate based on a variety of sensor systems. The upper line 720 is one representation of multimodal combination of the estimations. In this simple case the grouping of unimodal estimations where the multimodal curve peaks 730 makes it the most likely positional estimate.

Figure 8:
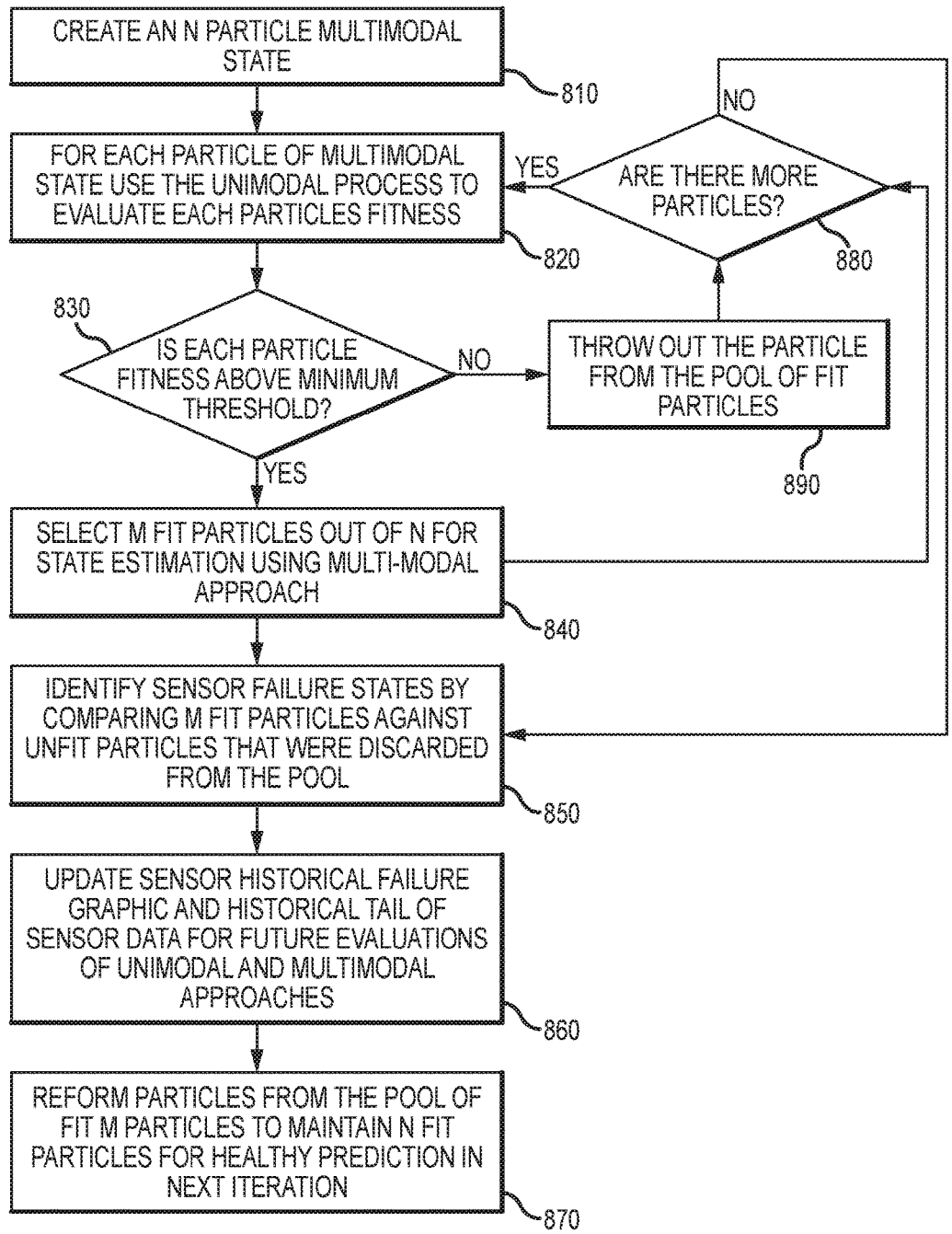
FIG. 8 is a flowchart for one multimodal embodiment for positional estimation according to the present invention.

As one of reasonable skill in the relevant art will appreciate this is a very simple illustration of a multimodal approach to address adaptive positioning estimation. However, as shown the flowchart that follows the basic concept present in FIG. 7 is applicable. FIG. 8 is a flowchart for one multimodal embodiment for positional estimation according to the present invention. In this rendition a partial filter is applied to determine a multimodal estimation of an object's position. The process begins with the creation 810 of an particle multimodal state. For each particle within the multimodal state evaluate 820 the particle fitness using the unimodal process.

The process then inquires 830 as to whether each particle's fitness is above a certain threshold. From the particles that were established at the beginning M fit particles remain for multimodal estimation. The unfit particles are removed 890. The system also inquires if there are additional particles 880 to replace those that have been removed and by doing so the system will eventually gain fit particles for the multimodal estimation.

Sensor failure is identified 850 by comparing the fitness of particles remaining to those particles that have been removed. A particle is evaluated based a defined cost function that evaluates the fitness of a particle. This cost incurs from the deviation of the particle state from the "most fit" state of a particle in the current pool. These states are the pose of the vehicle (x, y, z, roll, pitch, yaw) and can also include sensor failure modes. For example, GPS will have a binary failure mode, fit or multi-path, thus if the unfit particle has predicted a state with GPD in multi-path while particles from most densely populated region (fit particles) do not match then that particle will have a lower probability of existence after this iteration.

With sensor failures identified a graph or map of sensor failure or sensor degradation is prepared. Historical information related to the failure or degradation of a sensor is updated 860 for future use with the unimodal or multimodal process. The particles of the multimodal estimation are thereafter reformed 870 to maintain fit particles for positional estimation.

This set of "fit" particles now predict the next state of the robot using information about the kinematics of the vehicle, previous state, sensor heatmap and historical tail from maps with landmarks as described above, then evaluate this prediction against new calculated robot state when any new data is received from the plurality of sensors on board the system. Hence, in every iteration each particle is forced to predict a new state using known data and then evaluated for fitness when new sensor data is received.

In addition, the present invention also uses the performance of the particle filter to predict the correct state of the system to learn from its own failure. This information then can also be used to update the sensor heatmap for better future predictions.

Another aspect of the present invention is behavioral integration of sensor failure probability. Certain positional sensors operate better than other in certain conditions. For example, a GPS estimation requires a clear line of sight between the receiver located on the object and four satellites orbiting overhead. The same is true with respect to trilateration from ranging transmitters. It is well known that GPS signals are degraded in canyons and urban environments. The primary reasons are either the lack of a clear, line-of-sight signal path due to obstructions, or else a condition known as "multipath". Multipath errors result from the reception of two or more instances of the same signal, with each instance having a different time of flight. The signal "bounces" off (i.e., is reflected from) terrain or structures. The receiver does not know what signal is truly a direct line of sigh reception or a reception of a signal that has been reflected and thus possesses a longer, incorrect time of flight. Based on the position certainty value, which is an output of the present invention, the behavior orchestration system can cue behaviors that address position uncertainty and also adjust behavior for safety and performance. When position certainty is low the system can initiate behaviors such as NeedToStop, AvoidAreaWithNoTags, AvoidAreaWithPoorPositionHistory, SlowDownTillPositionKnown, SpinTillHeadingFixed, RaiseTagToReestablishUWBConnection or FindNearestLandmark.

Figure 9:
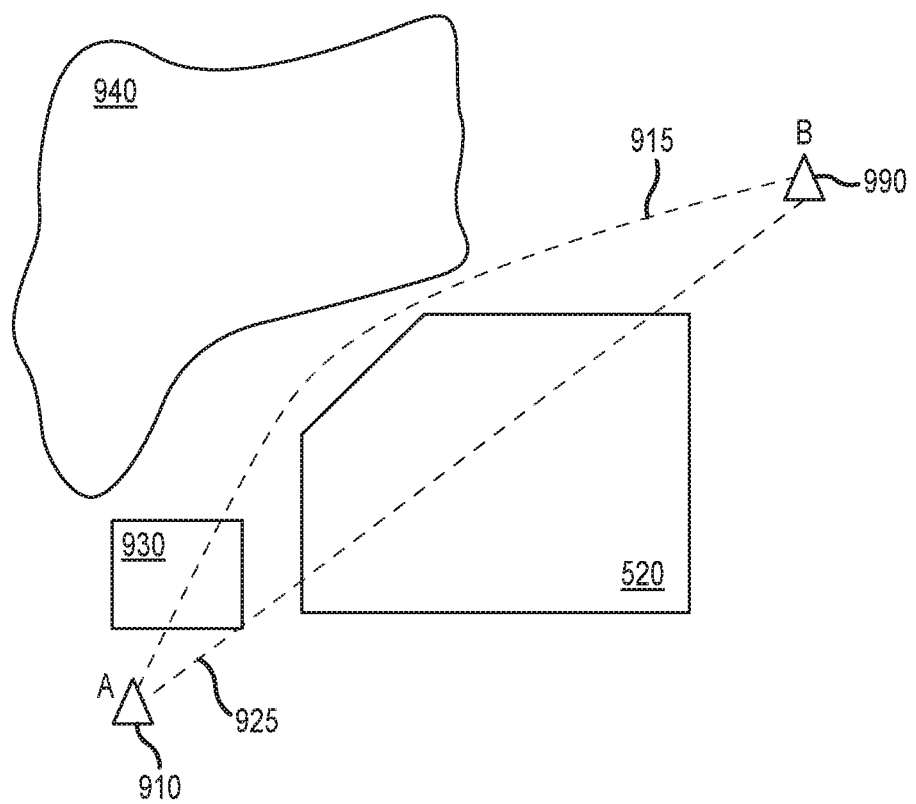
FIG. 9 is a top-view illustration of an overlay of a mission objective path with historical sensor failure data used to revise and optimize movement of an object to minimize sensor failure.

Similarly, a landscape devoid of discrete characteristics may render LiDAR or SLAM ineffective or at least degraded. One embodiment of the present invention uses historical degradation or sensor failure information to modify an object's path to optimize continued sensor success. FIG. 9 is top view rendition of a proposed path of an object using the Adaptive Positioning System of the present invention that uses sensor heatmaps generated using observations from unimodal and multimodal state estimators. The object is assigned the task to move from point A 910 to point B 990. Historically several areas between the two points has been identified as experiences sensor failure. In this case objects traversing the lower area 920 have experienced failure of one type of positional sensor. The area on the upper portion of the page represents a similar region of failure 940 but one that is associated with a different type of positional sensor. Lastly the third area 930 immediately above the staring point represents degradation or failure of yet a third type of sensor. Each area of sensor failure represents a gradient of risk. In this cased the center of the area has a higher likelihood of sensor failure than the outer boarders. One of reasonable skill in the relevant art will appreciate that each of the areas of risk many possess different gradients and levels of severity.

The most direct route from point A 910 to point B 990 is a straight line 925. Such a path, however, would take is directly through an area of known sensor failure. One aspect of the present invention is to integrate the impact of unimodal positional sensor failures based on historical or otherwise obtained risk data on mission parameters. In the present example, a route 925 fashioned between the areas of risk minimizes positional sensor failure. And while the selected route traverses the lower most area of risk 930 the present invention can assess the risk to the multimodal estimation of position as low. In this case since the risk of sensor failure occurs near the beginning of the path, dead reckoning and other sensors are still extremely accurate and thus mitigate the lost of, for example, UWB positional determination.

Figure 10:
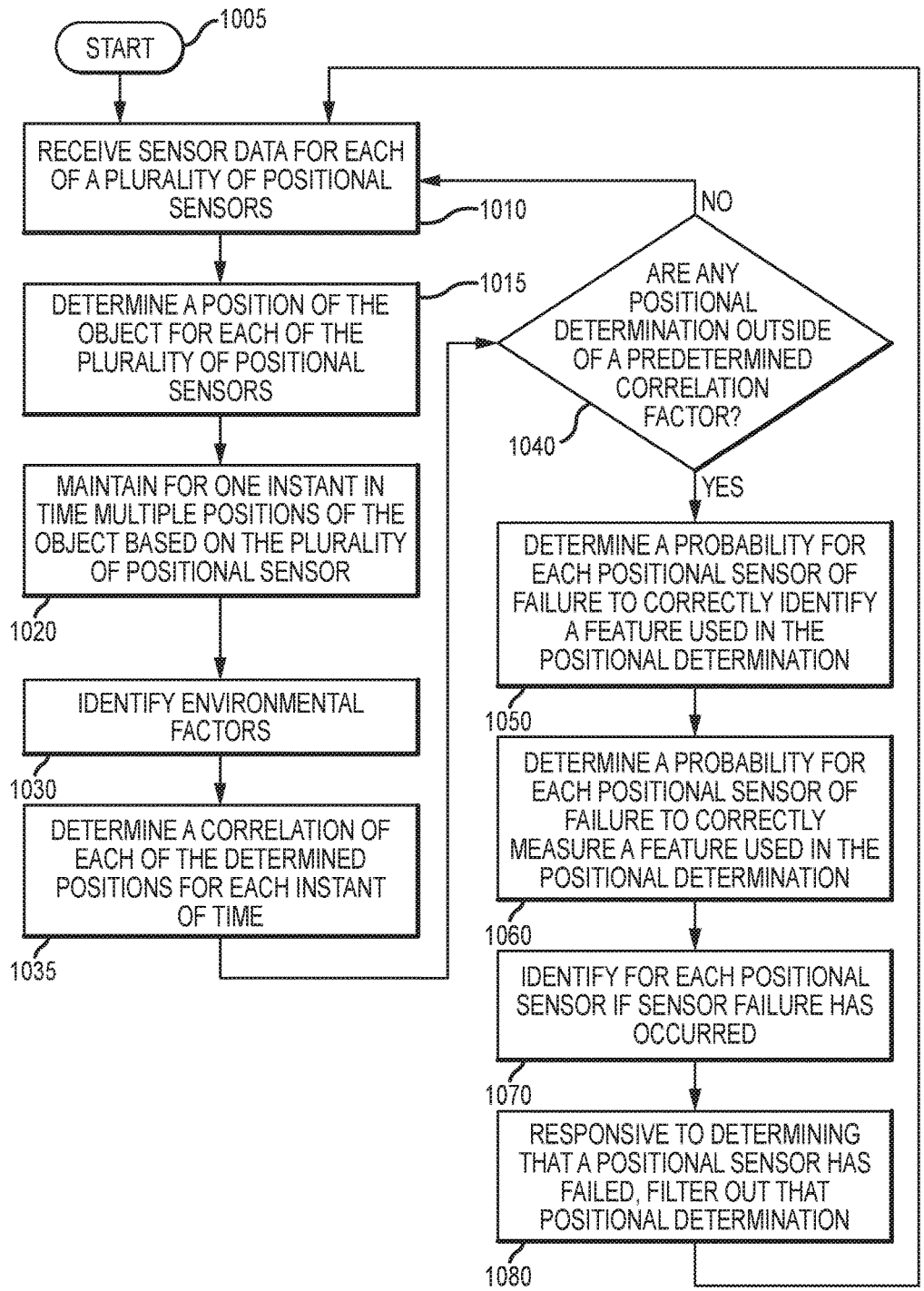
FIG. 10 is a flowchart of another method embodiment for multimodal adaptive positioning of an object according to the present invention.
Figure 11:
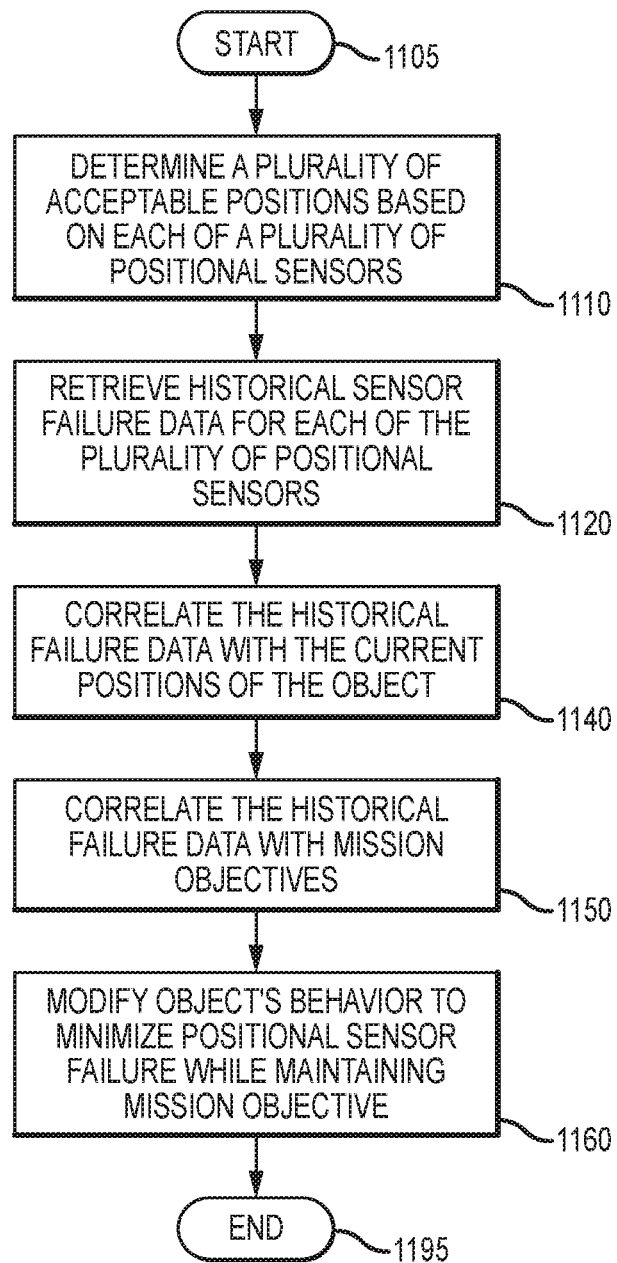
FIG. 11 is a flowchart of one method embodiment for modifying an object's behavior based on historical sensor failure data.

FIGS. 10 and 11 present flowcharts depicting examples of the methodology which may be used adaptively estimate the position of an object using multimodal estimation.

One methodology of the Adaptive Positioning System of the present invention begins 1005 with receiving 1010 sensor data from each of a plurality of positional sensors. From the data the unimodal estimator determines 1015 an estimated position of an object for each sensor. Each of these positional estimations is maintained 1020 for each instantiation of a period of time. Environmental factors are identified 1030 and considered as the system correlates 1035 each determined position.

At this point the methodology inquires 1040 whether any of the positional determinations is outside of a predetermined correlation factor. If there are none that are outside of the predetermined correlation factor, the process returns to the beginning receiving new data 1010 and determining new positional estimates 1015. When a sensor is found to be outside of a correlation factor determination is made whether the sensor's estimate is degraded or the sensor has failed. In doing so a probability of failure is determined for each positional sensor to correctly identify 1045 one or more features used to make the positional determination. One of reasonable skill in the art will recognize that for each sensor the features that its uses to make a positional determination vary.

The method thereafter determines a probability of failure by the sensor to correctly measure 650 a feature used to make a positional determination. Using these probabilities, the Adaptive Positioning System of the present invention, in this embodiment, identifies for each sensor whether sensor failure 1055 has occurred.

Responsive to a determination of the failure of a particular sensor 1060 the Adaptive Positioning System of the present invention filters out that positional determination and eliminates its contribution to the overall assessment as to the object's estimated position. With the failed sensor removed from consideration the process begins anew and gain makes a determination as to whether this or other positional sensors have failed.

FIG. 11 is a flowchart of another method embodiment for integration of the Adaptive Positioning System of the present invention with an object's behavior. The process begins 1105 with the determination 1110 of a plurality of estimated positions based on a plurality of positional sensors. With this multimodal rendition of positional information historical sensor failure data is retrieved 1120 for each of the positional sensors.

The historical failure data is correlated with the current position of the object 1140 and with the mission objectives 1150. Based on the historical positional sensor failure data, the process concludes 1195 with the mission objective behavior being modified 1160 to minimize positional sensor failure while maintaining mission objectives.

Another embodiment of the present invention combines dead reckoning (e.g. wheel odometers, inertial data, etc. or a combination thereof) and high precision time-of-flight ranging transmitters to localize precisely in environments with sparse update rates and/or radio/transmitter density. According to one embodiment of the present invention an object determines a local frame of reference using dead reckoning along the path traveled through space and thereafter performs a best-fit optimization of the path to available range data based on a signal transmission/reception, predefined transmitter locations and a time stamp associated with the ranging transmission.

According to one embodiment, the location of the transmitters is known/defined a priori and each transmitter is uniquely identified by a time-of-flight conversation. When the object is within a predetermined distance of a transmitter's predefined location, based on an estimation of the object's position from dead reckoning, the transmitter initiates a time-of-flight conversation with that transmitter. The conversation is time stamped and paired with the dead reckoning local frame position. When a threshold number of conversations have taken place a non-linear least-squares optimization is run to update the transformation of the robot's local frame of reference to a global frame of reference. Each time-of-flight conversation defines a ranging sphere (shell) where the object at the corresponding time stamp could have been. A distance is defined from the local frame position estimate to the ranging sphere is defined (distance from position to beacon minus the range estimate) for each time stamped range-position pair. A non-linear, "least-squares" optimization is then run to find the dead reckoning path through the global frame with the least distance-based cost.

Figure 12:
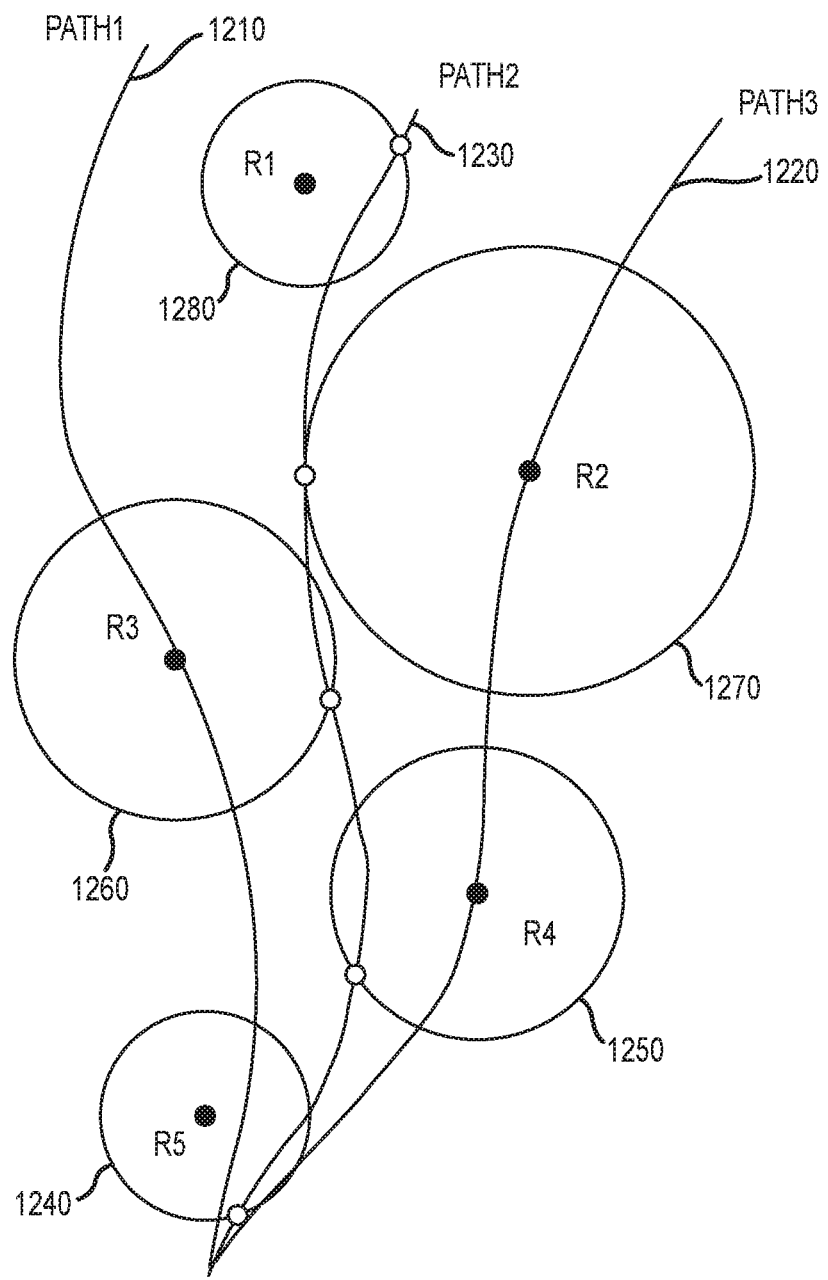
FIG. 12 a graphical depiction of combined dead reckoning and high precision time-of-flight ranging radio to identify an optimized path.

Uniquely identifiable ranging transmitters with a priori know locations are used as well as any number of dead reckoning tools such as compasses, wheel encoders, inertial sensors, gyroscopes, and fusion algorithms (e.g. extended Kalman filter). The dead reckoning sensors provide a short-term estimate of the relative offset of the vehicle in a local space, while the ranging transmitters are used to tie this space to a global frame. Techniques today typically require both high update rates and at least four ranging radios within proximity such that trilateration can take place. The invention disclosed herein requires neither. FIG. 12 a graphical depiction of combined dead reckoning and high precision time-of-flight ranging radio to identify an optimized path.

FIG. 12 presents three paths. Path 1 1210 and path 3 1220 represent the possible limits of drift with respect to dead reckoning technology. These two outside paths are the boundaries between which the actual path exists. Within those boundary paths 1210, 1220 exists a plurality of radio transmitters 1240, 1250, 1260, 1270, 1280 with known locations. Using ranging information from a known transmitter the actual path 1230 can be refined. As the object enters a region in which reception from a transmission is likely, a time-of-flight range reading can occur to refine the actual location of the object. In this case a path refinement occurs 6 times so as to produce an accurate depiction of the true path 1230.

Current ranging-radio localization techniques have a difficult time scaling to multiple vehicles or persons in the same area because of bandwidth limits. Current technology requires upwards of 40 Hz range updates from at least four ranging radios to give precise estimates of global frame motion. This alone is nearly at the update limit of the technology. This embodiment of the present invention reduces the number of required ranging radios (because trilateration techniques are not required) and significantly lowers required update rates. Such an improvement will allow the present invention to expand into environments with many more objects localized.

Another embodiment of the present invention allows for direct calculation of the drift of the odometry frame without first estimating the position of the robot with respect to the map. The design that follows describes the 2D case (X, Y, Phi) for this Kalman filter, but extension to the 3D case (X, Y, Z, Theta, Psi, Phi) should be obvious from the description.

Typically, robot localization involves trilateration as described herein from ranging radios which are uniquely identifiable. As discussed above, robots generally have a form of odometry estimation on board wherein ranges and odometry can be fused using a Kalman filter. However, over large periods of time the vehicle odometry becomes unreliable. A need therefore exists to bring odometry (aka dead reckoning) inline with that of the robot's actual position.

According to one embodiment of the present invention the transform begins with the classic Kalman filter form:

$$x_k = f(x_{k-1}) + w_k$$

$$z_k = h(x_{k-1}) + v_k$$

With the states:

$$x = \begin{bmatrix} x_T \\ y_T \\ \phi_T \end{bmatrix}$$

and $$f(x) = F = \begin{bmatrix} 1 & 0 & 0 \\ 0 & 1 & 0 \\ 0 & 0 & 1 \end{bmatrix}$$

Recall that covariance is high so it can settle.

$$Q = ?$$

$$P = \begin{bmatrix} 10 & 0 & 0 \\ 0 & 10 & 0 \\ 0 & 0 & 10 \end{bmatrix}$$

Covariance is then updated.

$$P_{k|k-1} = F_{k-1} P_{k-1|k-1} F_{k-1}^T + Q_k$$

And the time-of-flight radio measurement is $$z = [r_{uwb}]$$

Given the odometry pose, the estimate of the current transform is:

$$x_{est} = x_0 + x_T \cos(\phi_T) - y_T \sin(\phi_T)$$

$$y_{est} = y_0 + x_T \sin(\phi_T) + y_T \sin(\phi_T)$$

$$\phi_{est} = \phi_0 + \phi_T$$

And wherein the observation function is simply the distance from the infrastructure to the likely location of the object.

$$h(x) = \sqrt{(x_i - x_{est})^2 + (y_i - y_{est})^2 + (z_i - z_m)^2}$$

Accordingly the observation Jacobian can be found by:

$$H_k = \frac{\partial h}{\partial x}\bigg|_{x_{k|k-1}}$$

$$H_k^T = \begin{bmatrix} \dfrac{x_T - y_0 \sin(\phi_T) - x_0 \cos(\phi_T)}{\sqrt{(z_i - z_v)^2 + x_T^2 + (2x_0 y_T - 2y_0 x_T)\sin(\phi_T) - (2x_0 x_T - 2y_0 y_T)\cos(\phi_T) + y_T^2 + x_0^2 + y_0^2}} \\ \dfrac{y_T + x_0 \sin(\phi_T) - y_0 \cos(\phi_T)}{\sqrt{(z_i - z_v)^2 + x_T^2 + (2x_0 y_T - 2y_0 x_T)\sin(\phi_T) - (2x_0 x_T - 2y_0 y_T)\cos(\phi_T) + y_T^2 + x_0^2 + y_0^2}} \\ \dfrac{(x_0 x_T + y_0 y_T)\sin(\phi_T) + (x_0 y_T + y_0 x_T)\cos(\phi_T)}{\sqrt{(z_i - z_v)^2 + x_T^2 + (2x_0 y_T - 2y_0 x_T)\sin(\phi_T) - (2x_0 x_T - 2y_0 y_T)\cos(\phi_T) + y_T^2 + x_0^2 + y_0^2}} \end{bmatrix}$$

Thereafter the Kalman filter updates according to the classic EKF equations. The R matrix is the single-valued variance of the range estimate. Multipath can be filtered out by discarding large variations, once the algorithm has settled.

Figure 13:
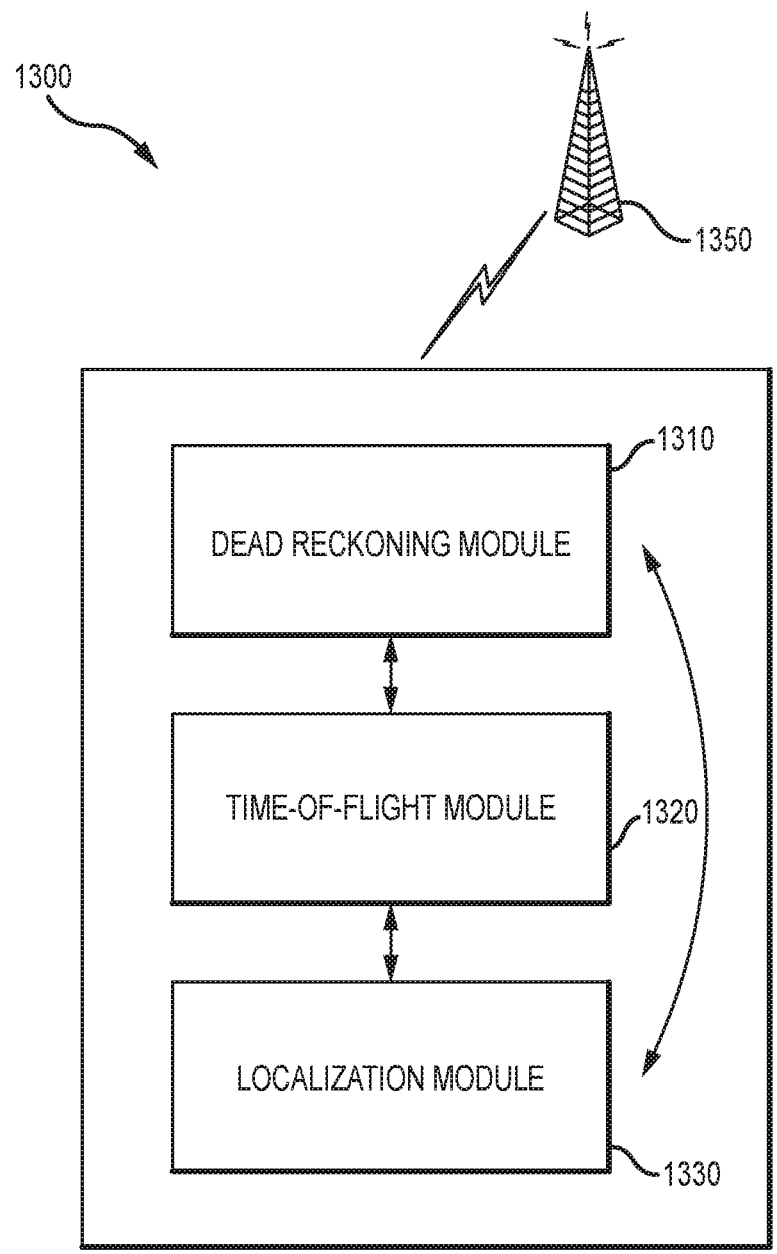
FIG. 13 is a high level block diagram for a system for mobile localization of an object having an object positional frame of reference using sparse time-of-flight data and dead reckoning according to one embodiment of the present invention.

FIG. 13 is a high level block diagram of a system for mobile localization of an object having an object positional frame of reference using sparse time-of-flight data and dead reckoning. The mobile localization system 1300 includes a dead reckoning module 1310, a time-of-flight module 1320 and a localization module 1330. Each module is communicatively coupled to each other to establish a positional location of an object.

As previously discussed the dead reckoning module 1310 maintains a fundamental localization estimation of the object based on odometry while the time-of-flight module 1320 receive a ranging signal from a UWB transceiver 1350 of a known location. In one embodiment of the present invention the time-of-flight module 1320 includes a list of known locations of a plurality of UWB transceivers 1350. Upon communication from the dead reckoning module 1310 that the object is within a predefined estimated range of a transceiver the time-of-flight module 1320 establishes one or more conversations with the transceiver to ascertain range information. After receiving several conversations range and bearing information can be determined which is thereafter passed to the localization module 1330 which refines the objects positional location.

Figure 14:
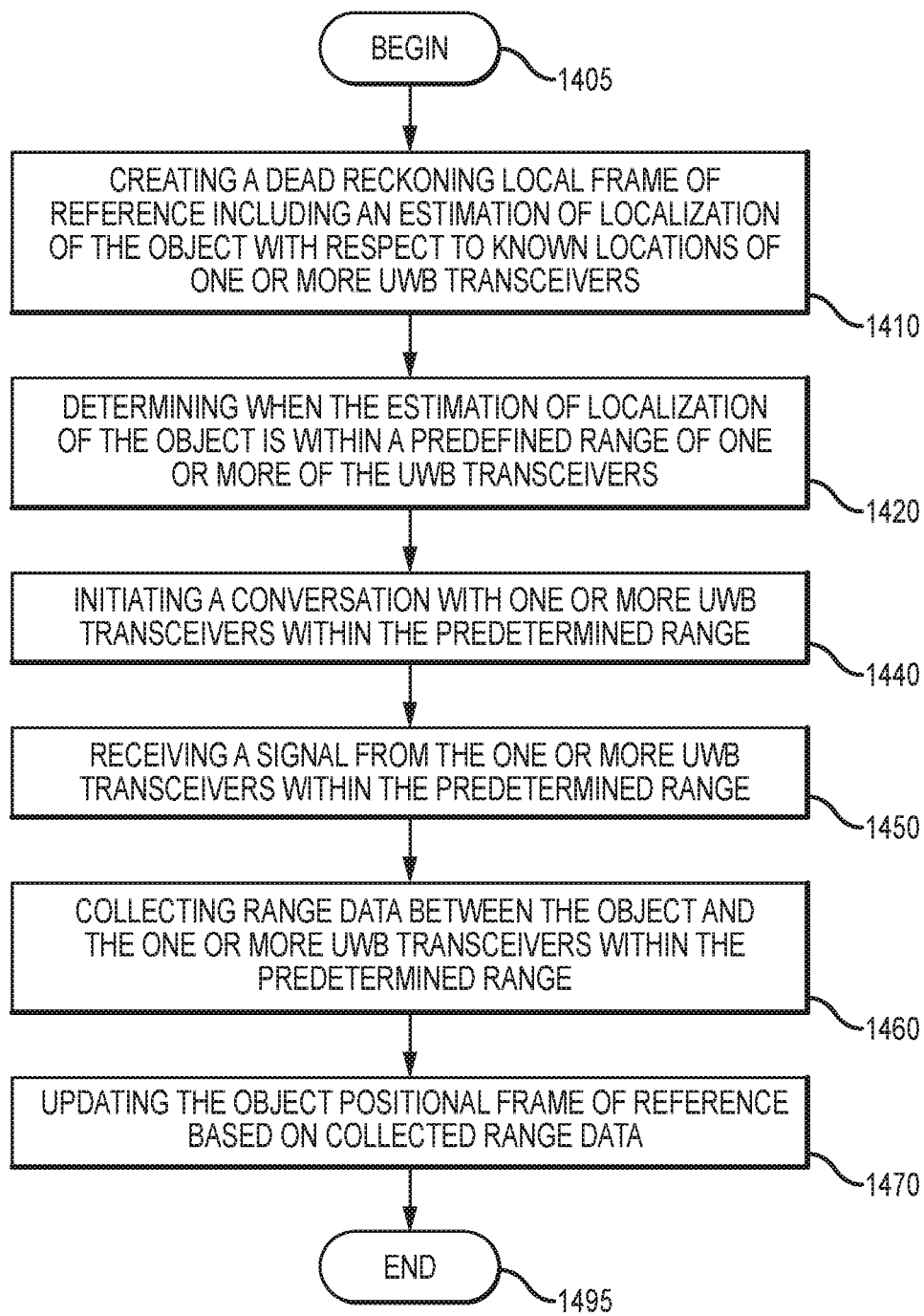
FIG. 14 is a flowchart method embodiment according to the present invention for mobile localization of an object having an object positional frame of reference using sparse time-of-flight data and dead reckoning.

FIG. 14 is one method embodiment for mobile localization of an object using sparse time-of-flight data and dead reckoning. The method begins 1405 by creating 1410 a dead reckoning local frame of reference wherein the dead reckoning local frame of reference includes an estimation of localization of the object with respect to known locations of one or more Ultra Wide Band transceivers. As the object moves along its path the method, using the dead reckon local frame of reference, determines 1420 when the estimation of location of the object is within a predetermine range of one or more of the Ultra Wide Band transceivers. Thereafter a "conversation" is initiated 1440 with at least one of the one or more of the Ultra Wide Band transceivers within the predetermined range. Upon receiving 1450 a signal from one or more UWB transceivers within the predetermined range, the object collects 1460 range data between the object and the one or more UWB transceivers. Using multiple conversations to establish accurate range and bearing information, the systems updates 1470 the object positional frame of reference based on the collected range data ending 1495 the process.

As suggested above and in a preferred embodiment, the present invention can be implemented in software. Software programming code which embodies the present invention is typically accessed by a microprocessor from long-term, persistent storage media of some type, such as a flash drive or hard drive. The software programming code may be embodied on any of a variety of known media for use with a data processing system, such as a diskette, hard drive, CD-ROM, or the like. The code may be distributed on such media, or may be distributed from the memory or storage of one computer system over a network of some type to other computer systems for use by such other systems. Alternatively, the programming code may be embodied in the memory of the device and accessed by a microprocessor using an internal bus. The techniques and methods for embodying software programming code in memory, on physical media, and/or distributing software code via networks are well known and will not be further discussed herein.

Generally, program modules include routines, programs, objects, components, data structures and the like that perform particular tasks or implement particular abstract data types. Moreover, those skilled in the art will appreciate that the invention can be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 15:
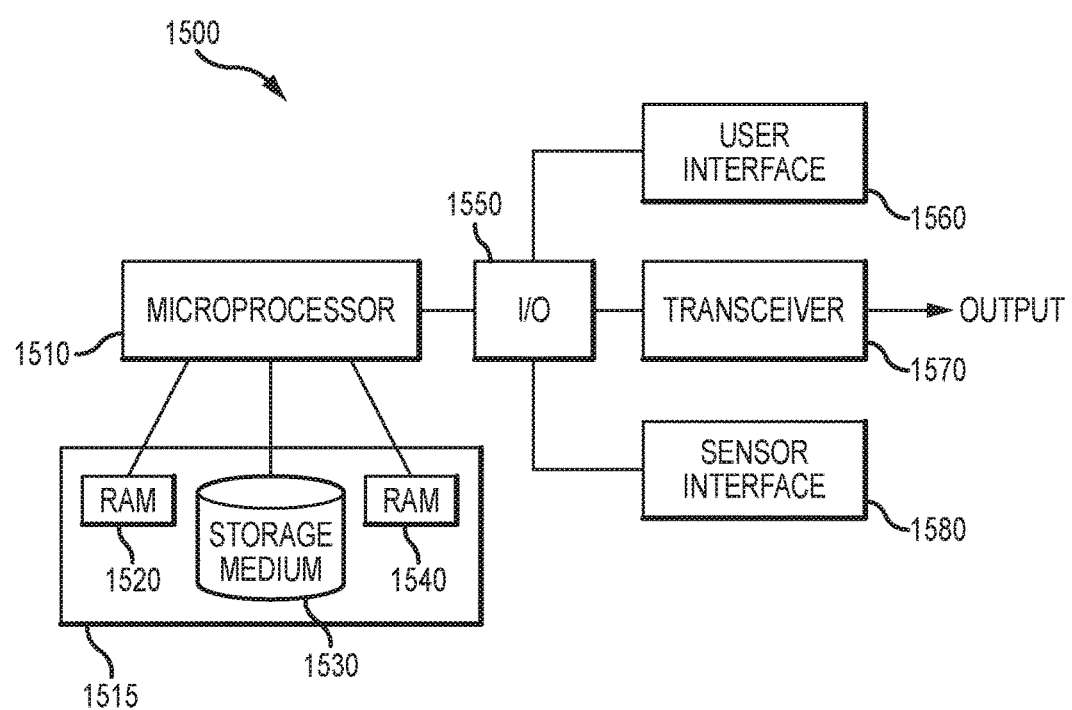
FIG. 15 is a representation of a computing environment suitable for implementation of the Adaptive Positioning System of the present invention.

An exemplary system, shown in FIG. 15, for implementing the invention a general purpose computing device 1500 such as the form of a conventional personal computer, a personal communication device or the like, including a processing unit 1510, a system memory 1515, and a system bus that communicatively joins various system components, including the system memory 1515 to the processing unit. The system bus may be any of several types of bus structures including a memory bus or memory controller, a peripheral bus, and a local bus using any of a variety of bus architectures. The system memory generally includes read-only memory (ROM) 1520, random access memory (RAM) 1540 and a non-transitory storage medium 1530. A basic input/output system (BIOS) 1550, containing the basic routines that help to transfer information between elements within the personal computer, such as during start-up, is stored in ROM. The personal computer may further include a hard disk drive for reading from and writing to a hard disk, a magnetic disk drive for reading from or writing to a removable magnetic disk. The hard disk drive and magnetic disk drive are connected to the system bus by a hard disk drive interface and a magnetic disk drive interface, respectively. The drives and their associated computer-readable media provide non-volatile storage of computer readable instructions, data structures, program modules and other data for the personal computer. Although the exemplary environment described herein employs a hard disk and a removable magnetic disk, it should be appreciated by those skilled in the art that other types of computer readable media which can store data that is accessible by a computer may also be used in the exemplary operating environment. The computing system may further include a user interface 1560 to enable users to modify or interact with the system as well as a sensor interface 1580 for direct collections of sensor data and a transceiver 1570 to output the data as needed.

Embodiments of the present invention as have been herein described may be implemented with reference to various wireless networks and their associated communication devices. Networks can also include mainframe computers or servers, such as a gateway computer or application server (which may access a data repository). A gateway computer serves as a point of entry into each network. The gateway may be coupled to another network by means of a communications link. The gateway may also be directly coupled to one or more devices using a communications link. Further, the gateway may be indirectly coupled to one or more devices. The gateway computer may also be coupled to a storage device such as data repository.

These and other implementation methodologies for estimating an object's position can be successfully utilized by the Adaptive Positioning System of the present invention. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

As will be understood by those familiar with the art, the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

We claim:

1. A method for mobile localization of an object time-of-flight data and dead reckoning, the method comprising:
    creating a dead reckoning local frame of reference wherein the dead reckoning local frame of reference includes an estimation of localization of the object with respect to known locations of one or more Ultra Wide Band (UWB) transceivers;
    determining when the estimation of localization of the object is within a predetermined range of one or more of the Ultra Wide Band transceivers;
    initiating a conversation with one of the one or more of the UWB transceivers within the predetermined range;
    receiving a signal from the one of the one or more UWB transceivers within the predetermined range, wherein the signal includes a time stamp associated with the conversation and paired with the dead reckoning local frame of reference;
    collecting range data between the object and the one of the one or more UWB transceivers within the predetermined range; and
    updating object position based on the collected range data.

* * * * *